INQUIRY SYSTEM

Filed March 15, 1963 14 Sheets-Sheet 1

INVENTORS
DUNCAN N. MAC DONALD,
F. L. FOX, I. C. Hansen
& R. S. Sharp
BY
Christie, Parker & Hale
ATTORNEYS.

INQUIRY SYSTEM

Filed March 15, 1963 14 Sheets-Sheet 2

INVENTORS
DUNCAN N. MAC DONALD,
F. L. FOX, I.C. Hansen
& R.S. Sharp
BY Christie, Parker & Hale
ATTORNEYS.

INVENTORS
DUNCAN N. MAC DONALD,
F. L. FOX, I. C. Hansen,
& K. S. Sharp
BY
Christie, Parker & Hale
ATTORNEYS.

INQUIRY SYSTEM

Filed March 15, 1963 14 Sheets-Sheet 4

INVENTORS
DUNCAN N. MAC DONALD,
F.L. FOX, I.C. Hansen
+ R.S. Sharp
BY Christie, Parker & Hale
ATTORNEYS.

INVENTORS
DUNCAN N. MAC DONALD,
F.L. FOX, I.C. Hansen,
BY & R.S. Sharp
Christie, Parker & Hale
ATTORNEYS.

INVENTORS
DUNCAN N. MAC DONALD,
F. L. FOX, I. C. Hansen
+ R. S. Sharp
BY
Christie, Parker & Hale
ATTORNEYS.

INVENTORS
DUNCAN N. MAC DONALD,
F.L. FOX, J.C. Hansen
BY & R.S. Sharp
Christie, Parker & Hale
ATTORNEYS.

INVENTORS
DUNCAN N. MAC DONALD,
F.L. Fox, I.C. Hansen
+ R.S. Sharp
BY Christie, Parker & Hale
ATTORNEYS.

INQUIRY SYSTEM

INVENTORS
DUNCAN N. MAC DONALD
F. L. FOX, I. C. Hansen
BY & R. S. Sharp
Christie, Parker & Hale
ATTORNEYS.

INVENTORS
DUNCAN N. MAC DONALD
F.L. Fox, T.C. Hansen
+ R.S. Sharp
BY Christie, Parker & Hale
ATTORNEYS.

INQUIRY SYSTEM

Filed March 15, 1963 14 Sheets-Sheet 11

INVENTORS
DUNCAN N. MAC DONALD,
F.L. FOX, I.C. HANSEN
& R.S. SHARP
BY Christie, Parker & Hale
ATTORNEYS.

SELECTION & CONTROL GATES-24

SELECTION & CONTROL GATES-24

SELECTION & CONTROL GATES-24

INVENTORS
DUNCAN N. MAC DONALD,
F. L. Fox, I. C. Hansen
& R. S. Sharp
BY Christie, Parker & Hale
ATTORNEYS.

INQUIRY SYSTEM

INQUIRY SYSTEM

Filed March 15, 1963 14 Sheets-Sheet 14

United States Patent Office 3,344,401
Patented Sept. 26, 1967

3,344,401
INQUIRY SYSTEM

Duncan N. MacDonald, Arcadia, Frederick L. Fox, Pasadena, Iver C. Hansen, Arcadia, and Richard S. Shays, Sierra Madre, Calif., assignors to Burroughs Corporation, Detroit, Mich., a corporation of Michigan
Filed Mar. 15, 1963, Ser. No. 265,435
16 Claims. (Cl. 340—172.5)

This invention relates to data processors and more particularly, to a system for making inquiry of information in a digital data processor.

Systems are well known wherein a storage device is provided at a central location for storing messages to be conveyed to remote inquiry stations for operator observation. Inquiry stations in such systems are provided with keyboard units, dial units, etc. for allowing an operator to set up a path through switching circuits (i.e. relay matrices) to a particular storage area in the central storage device which contains a desired message. The message is read out of the particular storage area back through the switching circuits to the operator of the remote inquiry station requesting the message. An example of this type of inquiry system is used in the New York stock exchange for allowing brokers to find out current stock price quotations.

Many times it is desirable for an operator to request information from a data processor. For example, it may be desirable for an operator to determine the result of the processing of certain data. Thus, in a banking system, an operator may desire to determine the current balance in an individual's bank account which is being updated automatically by a data processor. The information desired by the operator may either be stored in an internal memory of the data processor, in an auxiliary memory accessible to the data processor, or perhaps the information must actually be computed by the data processor itself.

Many additional problems arise in making inquiry of information from a digital data processor over those posed in requesting information in the aforementioned prior art stock quotation system. For example, the memory of the digital data processor may contain the answer to the inquiry, however, the reading circuits for the memory of the data processor may be busy with other processing operations and not available to read the desired information immediately. Also, in order to have a practical inquiry system, generally, there must be a large number of inquiry stations. Therefore, the complete inquiry system must be arranged and integrated so as to allow simultaneous inquiry messages to be composed and also be arranged to be compatible with the operation of a data processor.

To this end, a specific example of an inquiry system embodying the present invention is arranged so as to allow an operator to make inquiry of information in a data processor. The operator of the system may be a layman with a minimum amount of special skill or training in the operation of the system. For example, standard teletype units and telephone sets may be provided for composing inquiry messages for the data processor and for receiving printed replies and audible phonic answers to the inquiry message. Also, the system is versatile in that most any type of standard station inquiry unit may be used. In addition, the data processor may communicate with the inquiry system in its own special method of sending and of receiving information, whereas communication with an operator is made via the aforementioned well known methods of communication. Further, the system has a special modularity such that the system may be expanded as the inquiry load increases with only minor modifications in the system. An inquiry system embodying the present invention is particularly applicable to a system having some form of bulk storage device which is to be interrogated. The system is arranged so that parallel inquiries may be handled. This feature is extremely important in that the efficiency of the system may be maximized. For example, with ten separate trunks or channels for making inquiries through the inquiry system, it is estimated that 10,000 inquiries may be processed in an eight-hour day. Additionally, the system is arranged so that there is complete privacy between inquiry stations. Yet stations for making inquiries may be located remotely or immediately adjacent the data processor. The system is arranged so that the time required by the data processor for processing the inquiry is maintained at a minimum, an extremely important consideration in the use of a data processor.

A special buffer unit and associated control circuits are provided for each trunk or channel of the inquiry system. The buffer and associated control circuits provide versatility in the system by allowing variable length inquiry and data processor reply messages to be transmitted and minimize inquiry times.

Additionally, different types of station equipment use essentially identical inquiry system components. This feature eliminates the need for special equipment for each type of station equipment. Also, two wire transmission may be used between inquiry stations and the central part of the system. These and other features allow cost to be kept at a minimum.

Briefly an embodiment of the present invention in an inquiry system includes a digital computer having a memory therefor. A bulk memory unit is provided and the computer is arranged for receiving digital inquiry messages and forming digital reply messages in reply to the inquiry messages. The reply messages include inquiry messages derived from the bulk memory unit. A plurality of inquiry devices are arranged for independently providing digital inquiry messages comprising a series of signals to the computer. The inquiry devices receive reply messages from the computer. A memory means is connected between the computer and the inquiry devices for temporarily storing complete inquiry and reply messages provided by the computer and inquiry devices. The memory means comprises means for designating locations, one by one, in the memory means for storing signals. The memory includes means for selectively reading a stored inquiry message out thereof and for presenting a message to the computer. Means is provided for selectively storing a reply message read out of the memory means and for providing a reply message to the same inquiry device from which the corresponding inquiry message was received.

The present application asserts claim to the over-all inquiry system and certain subcombinations thereof. A co-pending patent application assigned to the same assignee as the present application entitled "Voice Encoder" filed in the name of Fox, now Patent No. 3,296,371, asserts claims to a voice encoder which is disclosed as a part of the inquiry system hereinafter described in detail.

These and other aspects of the present invention may be more fully understood with reference to the following description of the figures of which:

Figure 1:
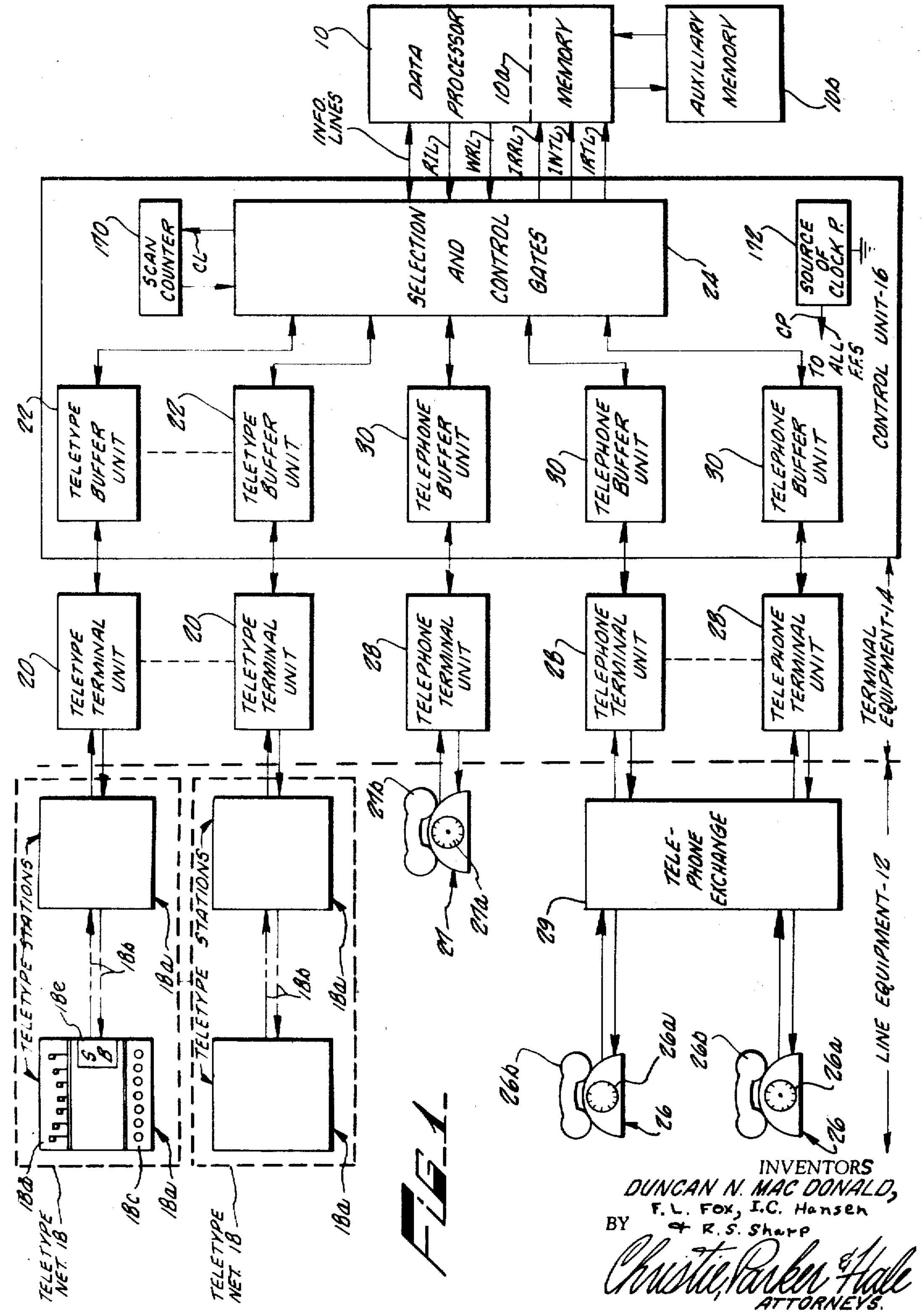
FIG. 1 is a general block diagram of an inquiry system for a digital computer and embodying the present invention.
Figure 2:
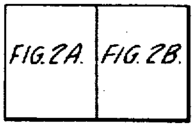
Figure 2A:
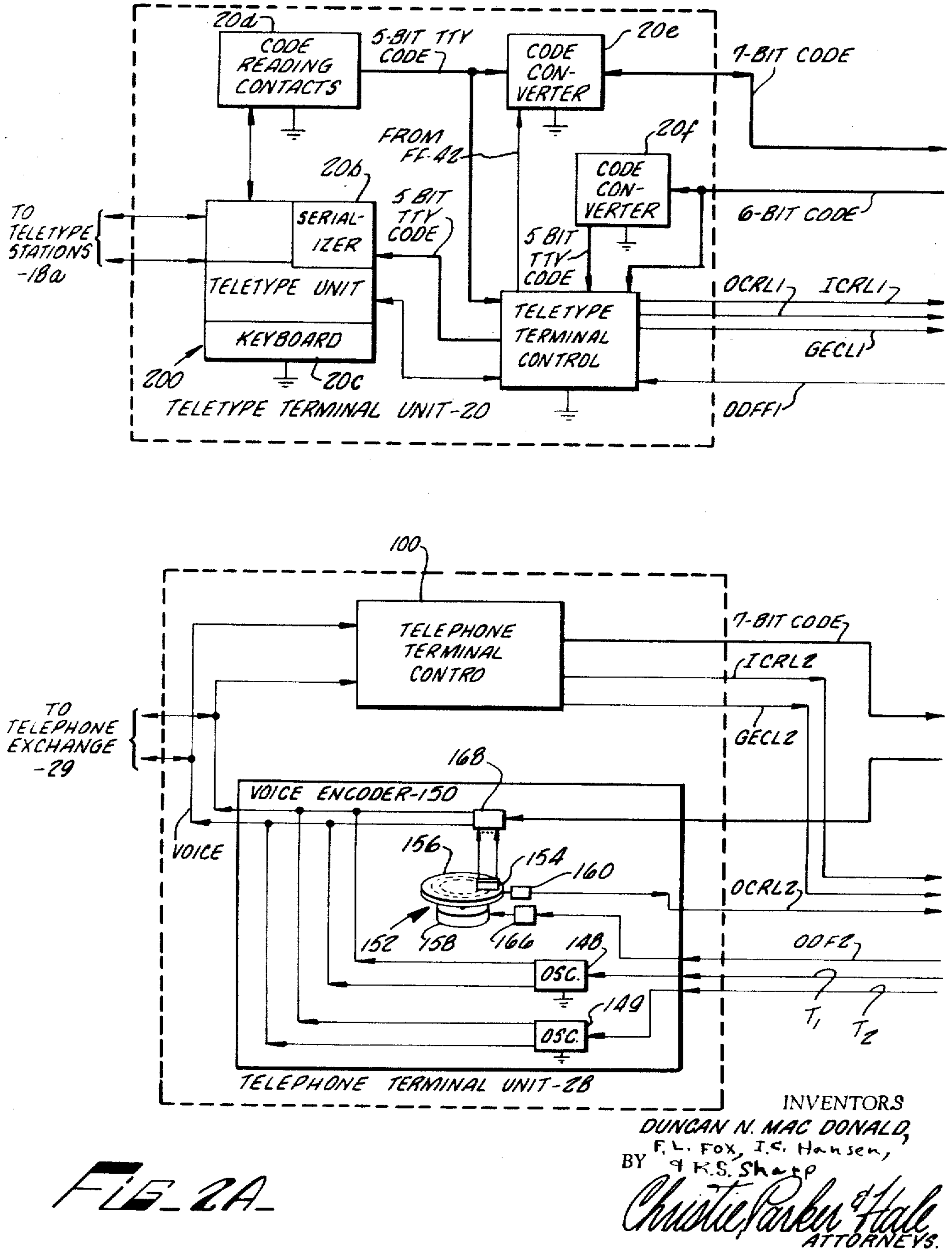
Figure 2B:
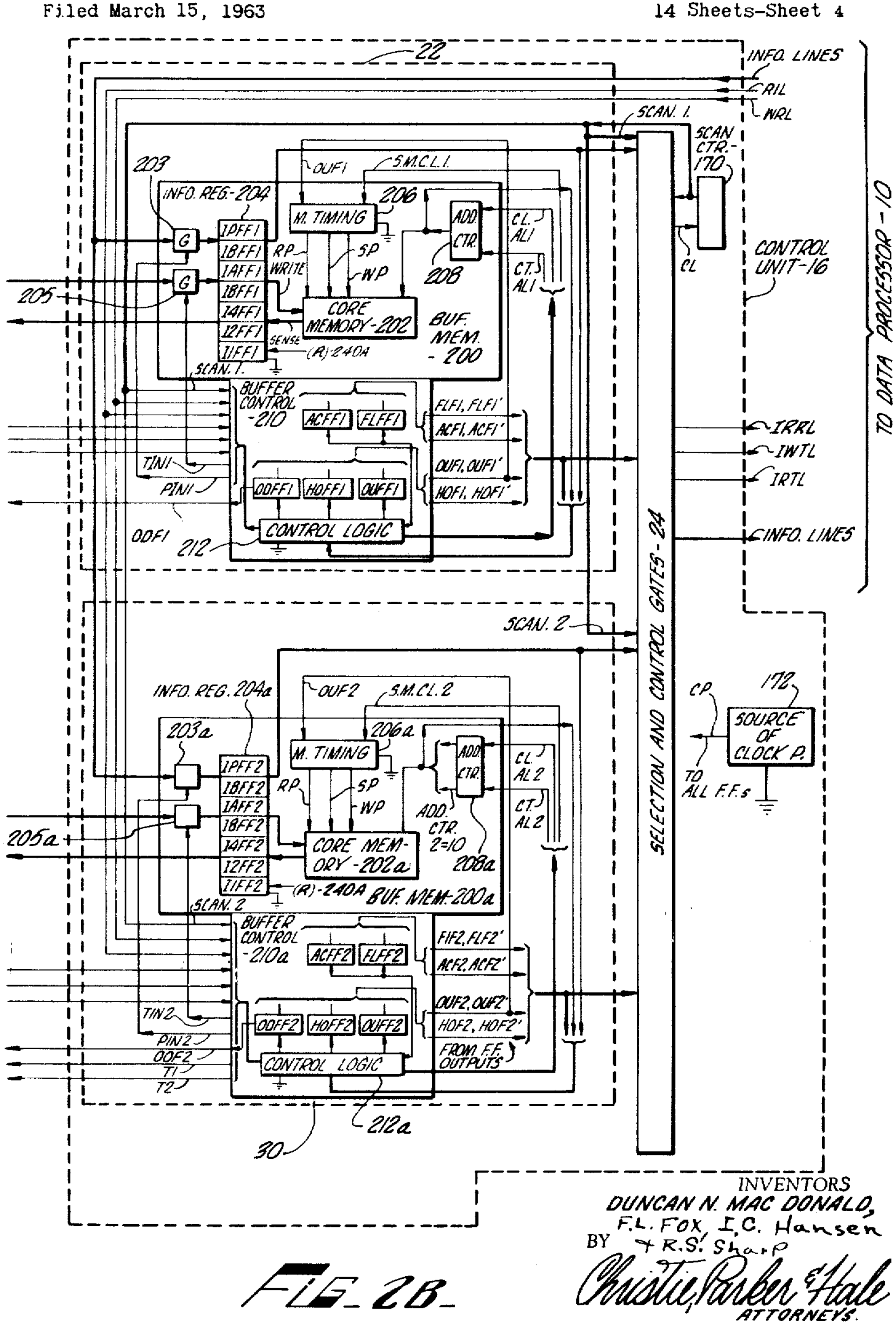
Figures 2C, 4, 8:
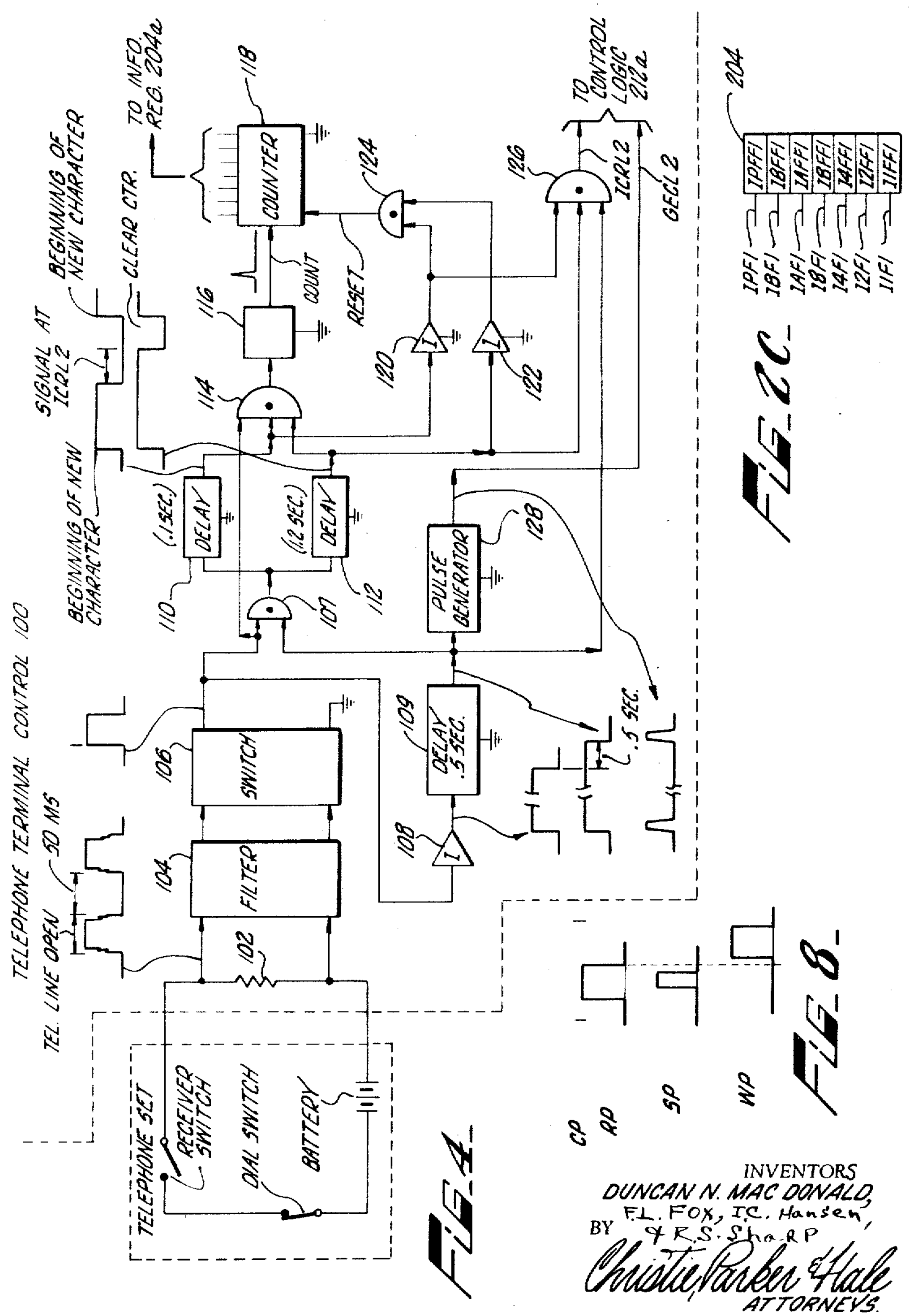
Figures 3A, 3B:
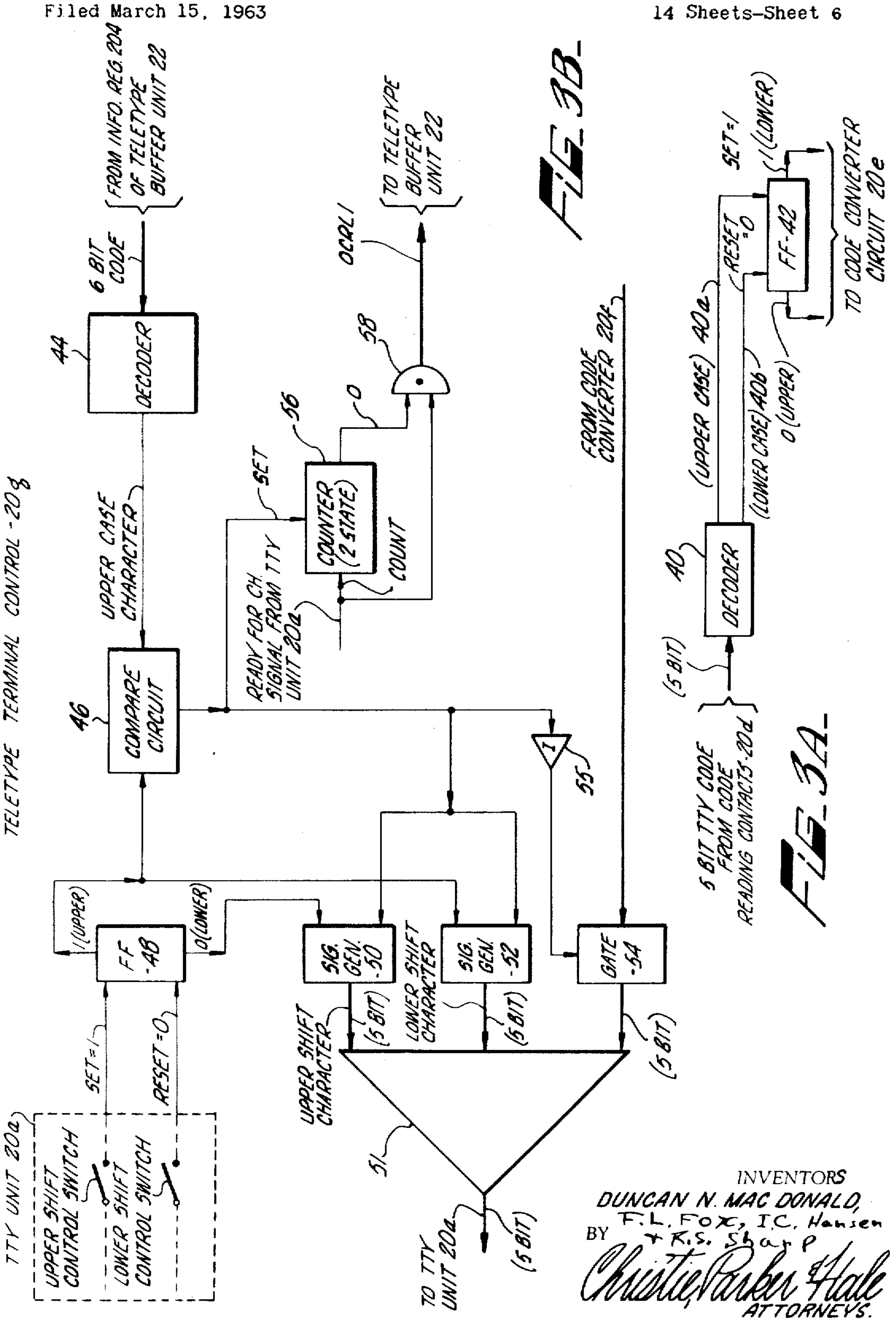
Figure 5:
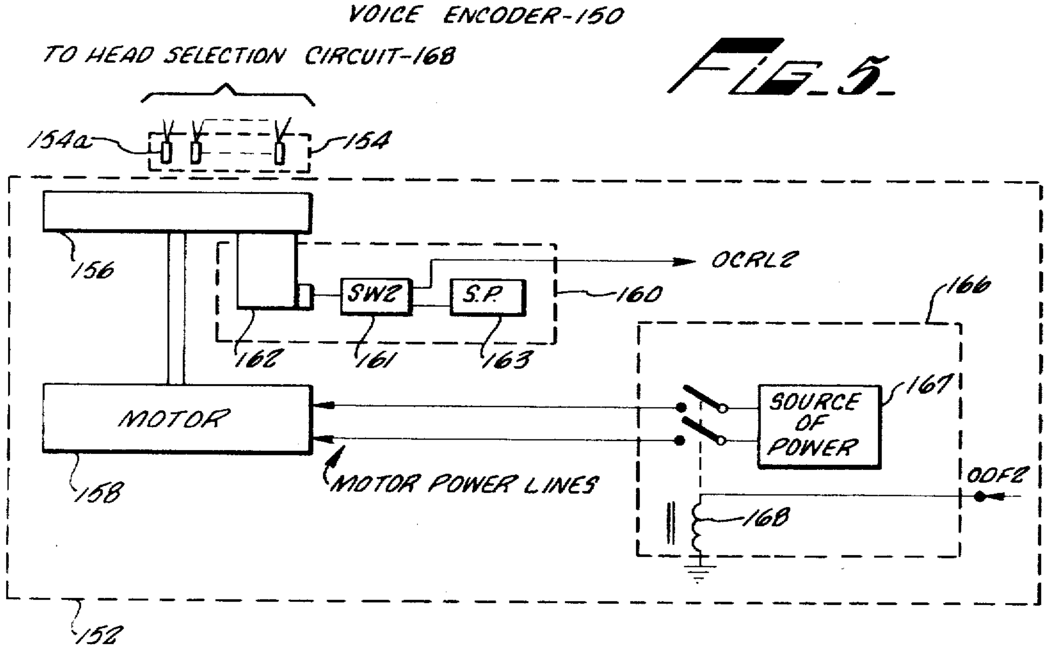
Figures 9, 10:
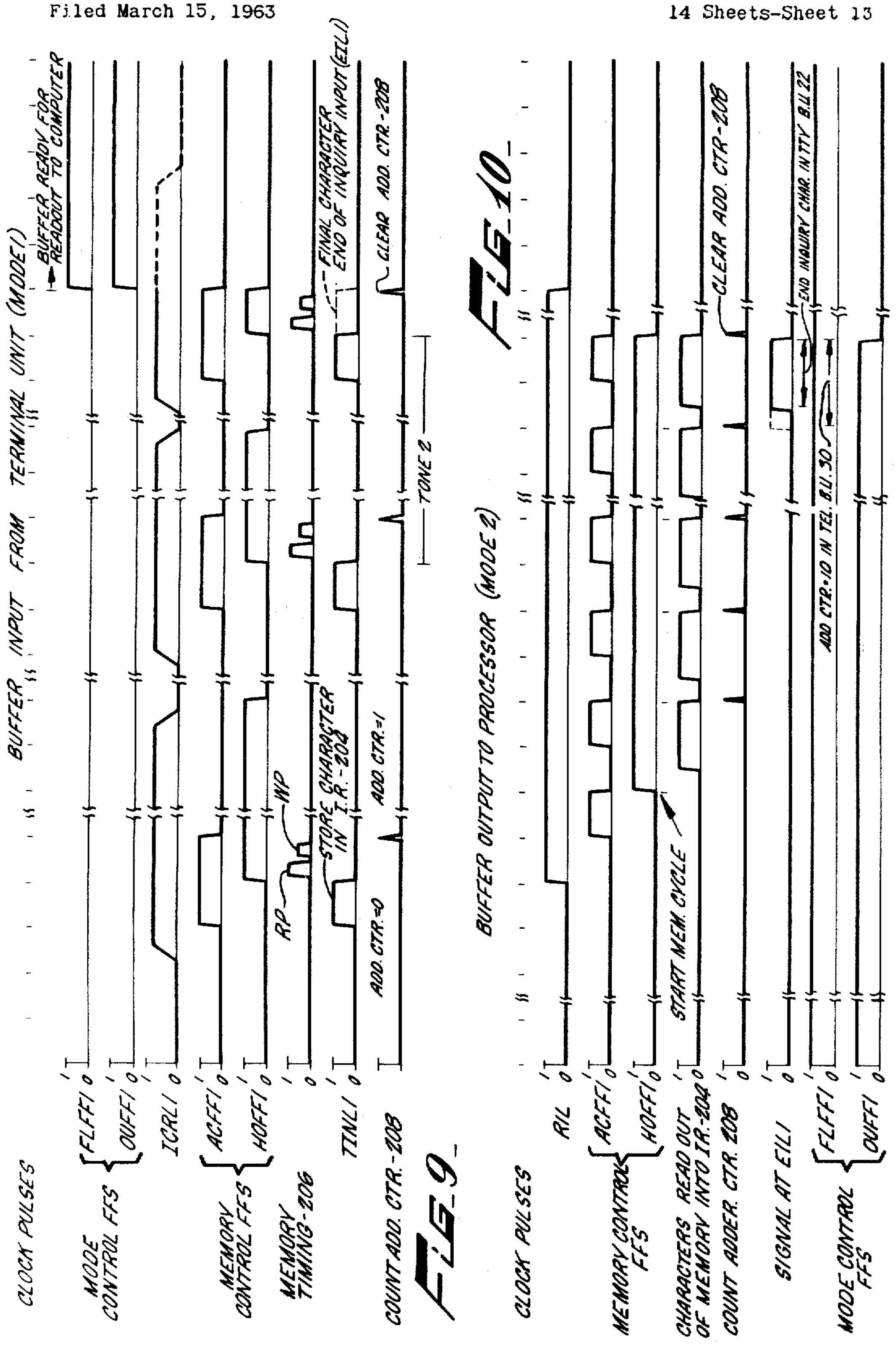
Figure 11:
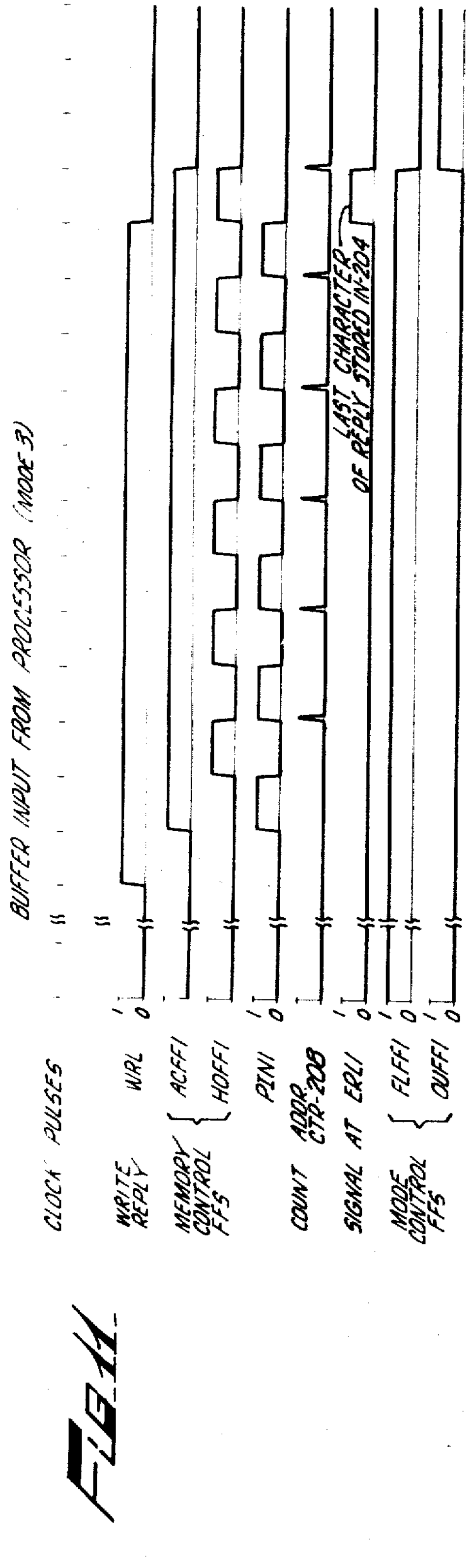
Figure 12:
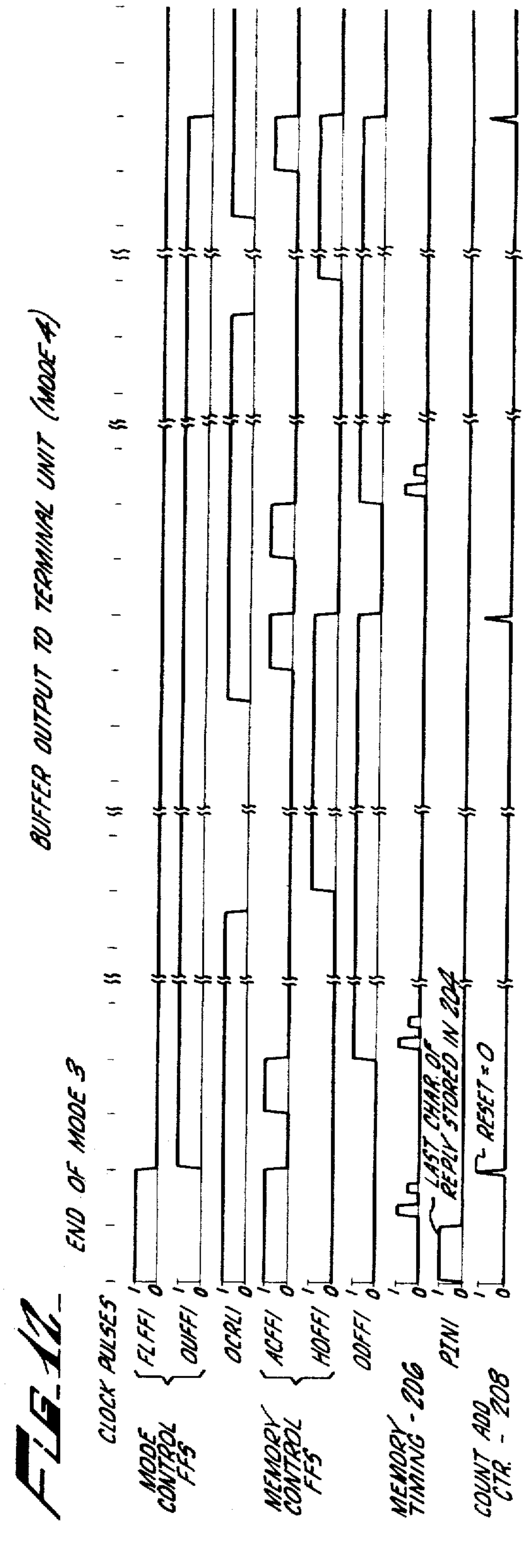

FIG. 2, composed of FIGS. 2A and 2B, is a detailed block diagram of the terminal equipment and control unit of the inquiry system of FIG. 1 and embodies the present invention;

FIG. 2C is a sketch illustrating the output circuit of the information registers of FIG. 2;

FIGS. 3A and 3B are block diagrams of the teletype terminal control unit of FIG. 2;

FIG. 4 is a detailed block diagram of the telephone terminal control unit of FIG. 2;

FIG. 5 is a block diagram of the voice encoder unit in the telephone terminal unit of FIG. 2;

FIGS. 6A through 6K are schematic diagrams showing the gating circuits of the buffer control circuits of FIG. 2;

FIGS. 7A through 7E are schematic and block diagrams of the selection and control gates of FIG. 2;

FIG. 8 is a timing diagram illustrating the sequence of operation of the memory timing units of FIGS. 1 and 2;

FIG. 9 is a timing diagram illustrating the buffer input from terminal unit mode of operation of the buffer unit of FIGS. 1 and 2;

FIG. 10 is a timing diagram illustrating the buffer output to processor mode of operation of the buffer units of FIGS. 1 and 2;

FIG. 11 is a timing diagram illustrating the buffer input from data processor mode of operation of the buffer units of FIGS. 1 and 2;

FIG. 12 is a timing diagram illustrating the sequence of operation of the buffer output from terminal unit mode of operation of the buffer units of FIGS. 1 and 2.

GENERAL DESCRIPTION

Refer now to FIG. 1 which shows a general block diagram of an inquiry system for a digital data processor and embodies the present invention. A digital computer or data processor 10 is shown for receiving inquiry messages requesting information stored in a memory **10*a* of the data processor 10 or an auxiliary bulk memory unit 10*b*. The data processor 10 may be arranged in a number of ways well known in the computer art for reading information out of the auxiliary memory 10*b* as needed in accordance with the type of memory device employed. Additionally, the data processor 10 is arranged to compose a reply message in answer to the inquiry message by processing data stored in the memory 10*a* or the auxiliary memory 10*b*. After composing a reply message to the inquiry message in the aforementioned manner, the data processor 10** is arranged for sending the reply message back to the requesting equipment.

The data processor 10 is arranged for receiving inquiry messages composed of digital signals arranged in computer coded characters and for providing reply messages in the same computer coded characters. The inquiry and reply message characters are characterized in form as serial-by-character and parallel-by-bit.

The inquiry system for presenting inquiry messages to the data processor 10 and for receiving reply messages to the inquiry messages includes inquiry means, terminal means and buffer means hereinafter referred to as line equipment 12, terminal equipment 14, and a control unit 16. By way of example, two types of line equipment 12 are shown, teletype equipment and telephone equipment. However, it should be understood that other well known types of line equipment 12 may be used; for example, perforated paper tape reading and punching units, keyboard message composing units, display tube units for displaying reply messages for an operator, etc.

Refer now specifically to the line equipment 12. Included are a plurality of teletype nets 18. Each teletype net 18 has a plurality of teletype stations **18*a* connected in a series net arrangement by means of a pair of wires 18*b*. The series teletype net is a well-known arrangement commonly used in teletype installations. Also included in the line equipment 12 are a plurality of telephone sets 26 and 27 of the type commonly used in telephone systems. The telephone sets 26 are connected through a telephone exchange (PBX unit) 29 to the terminal equipment 14, whereas the telephone set 27 is connected directly to the terminal equipment 14**.

Refer now to the terminal equipment 14. Each teletype net 18 is connected through a separate teletype terminal unit 20, in the terminal equipment 14, to the control unit 16. Similarly the telephone set 27 is connected through a telephone terminal unit 28 to the control unit 16. The telephone exchange 29 is connected in parallel through two telephone terminal units 28, to the control unit 16.

Referring to the control unit 16, each of the terminal units 20 and 28 are connected to a separate buffer unit in the control units 16. The teletype terminal units 20 are connected to teletype buffer units 22, whereas the telephone terminal units 28 are connected to telephone buffer units 30.

The control unit 16 also has a scanning and selection means hereinafter called selection and control gates 24 for sequentially scanning the buffer units 22 and 30 and sequentially coupling ones containing complete inquiry messages to the data processor 10.

*Teletype inquiry operation*

Refer now to the operation of the inquiry system and assume an operator uses a teletype station **18*a* for making an inquiry to the data processor 10. The teletype station 18*a* being used by an operator to compose an inquiry message is hereinafter referred to as the "requesting teletype station." Using a requesting teletype station, an operator first selects the teletype terminal unit 20 using a selective calling technique which will be described hereinbelow. Next, the operator strikes the keys of a keyboard 18*c* of the requesting teletype station 18 causing a series of characters representing the inquiry message to be transmitted to the data processor 10. The signals transmitted by the requesting teletype station are a series of coded digital signals. The teletype terminal unit 20 translates the serial signals of each character into signals capable of being read in parallel. The teletype terminal unit 20 also translates the characters of the inquiry message from five bit teletype coded characters with intermixed upper and lower shift characters, into six bit computer coded characters used internally by the data processor 10**.

Each buffer unit 22 and 30 has four different modes of operation. The modes of operation of the buffer units are shown in Table I.

TABLE I

| Modes | States of Mode Control Flip-Flops | | Operation Buffer Units 22 and 30 |
|---|---|---|---|
| | FLFF1 | OUFF1 | |
| 1 | 0 | 0 | Buffer Input from Terminal Unit. |
| 2 | 1 | 1 | Buffer Output to Processor. |
| 3 | 1 | 0 | Buffer Input from Processor. |
| 4 | 0 | 1 | Buffer Output to Terminal Unit. |

To be explained in detail, mode control flip-flops in each buffer unit determine the mode of operation thereof. The modes of operation will hereinafter be referred to by number as indicated in Table I. The buffer units are always in Mode 1 during the time interval while an inquiry message is being composed and sent to a terminal unit from an inquiry unit.

Returning to the teletype inquiry operation, as the characters are translated by the teletype terminal unit 20, the buffer unit 22 reads and temporarily stores the characters in the order they are received. After the operator has typed out a complete inquiry message, he types an "end of inquiry character," which is a special character indicating that the message is complete.

The buffer unit 22 recognizes the end of inquiry character and switches from Mode 1 into Mode 2. Concurrently the control unit 16 sends a signal to the data processor 10 indicating that an inquiry message is ready to be read out of the teletype buffer unit 22.

The data processor 10 may be busy performing other data processing operations. Therefore, the teletype buffer unit 22 remains in Mode 2 until the data processor 10 is ready to process the inquiry message. The data processor 10 sends a control signal to the control unit 16 when it is ready to receive and process the stored inquiry message. Responsive to the control signal, the control unit 16 reads out the stored inquiry message, character by character in the same order as it was stored and the selection and control gates 24 couple the inquiry message characters to the data processor 10.

Subsequently, the teletype buffer unit 22 switches into Mode 3 during which it waits for a reply message and the data processor 10 processes the inquiry message. The data processor 10 sends another control signal back to the control unit 16 when it is ready to send the reply to the inquiry message. The data processor 10 then sends the reply message in computer code having characters characterized as serial-by-character and parallel-by-bit back through the control unit 16 to the same teletype buffer unit 22 from which the inquiry message was received by the digital data processor 10. The buffer unit 22 temporarily stores the reply message character by character in the order received. After sending the last character of the reply message, the data processor 10 sends an "end of reply character," which is identical to the end of inquiry character, thereby indicating that the reply message is complete.

The teletype buffer unit 22 receiving the reply message recognizes the end of reply character and automatically switches into Mode 4. In Mode 4 the teletype buffer unit 22 storing the reply message automatically reads out the reply message a character at a time. The connected teletype terminal unit 20 translates the six bit parallel-by-bit and serial-by-character reply message characters into five bit serial-by-bit teletype-coded signals with intermixed upper and lower shift characters and sends the translated reply message along the lines **18*b* back to the requesting teletype station 18*a*. The requesting teletype station 18*a* then causes the reply message to be typed out by a typing unit 18*d*** thereof for observation by the operator.

*Telephone inquiry operation*

Refer now to the operation of the system when an operator composes an inquiry message on a telephone set 26. The operator picks up the receiver of the telephone set 26 and, using a dial **26*a*, dials a prefix code which selects the telephone exchange 29. The telephone exchange 29 contains conventional circuits for automatically selecting one of the two connected telephone terminal units 28 which is not busy. If both of the telephone terminal units 28 are busy, communicating with one of the other telephone sets, the telephone exchange 29 sends a busy signal to a speaker 26*b*, in the receiver of the telephone set 26, indicating to the operator that he must wait until other inquiries have been completed. When one of the telephone terminal units 28 is not busy, a dial tone is sent to the operator of the requesting telephone set (via a speaker 26*b*) indicating that he may dial an inquiry message. The operator, using the dial 26*a*, dials a series of ten digits representing an inquiry message for the data processor 10**. Each digit is in conventional telephone code represented by a series of pulses, the total number of which represents the digit. Circuits for generating and receiving such signals are conventional in the telephone art. After the operator has dialed ten digits, he may pause and mentally check to make sure he has dialed the correct inquiry message. If the message is correct, the operator dials an extra digit indicating that the inquiry message was correct. Thus, a complete inquiry message is identified by an "end of inquiry character" for a teletype inquiry, whereas, a complete inquiry is identified by the presence of an eleventh digit of a telephone inquiry.

The telephone terminal unit 28 receives the digits and translates them from a series of pulses to a series of computer coded characters characterized as serial-by-character and parallel-by-bit.

Similar to the teletype buffer unit 27, the telephone buffer unit 30 is in a Mode 1 (see Table I) while the inquiry message is being composed at the telephone set 26. In Mode 1 the telephone buffer unit 30 reads each character as translated by the telephone terminal unit 28 and stores the characters in sequential storage locations thereof. When the eleventh character is received (after the ten characters of the telephone message), the buffer unit 30 switches into Mode 2. The control unit goes through Modes 2, 3 and 4 similar to that described above for the teletype buffer unit 22.

The operation of a telephone inquiry should be compared with the operation of a teletype inquiry during Mode 4. The reply message to a telephone inquiry is composed of a series of digitally coded characters representing the message. However, in contrast to a teletype reply message, each of the characters of a telephone reply message represents an audible word or a series of words which form a part of the complete reply message. As the telephone buffer unit 30 reads out each character of the reply message, the telephone terminal unit 28 translates the character into electrical signals capable of being transduced into an audible message component and transmits the signals along the wires to the speaker **26*b* of the requesting telephone set. The speaker 26*b*** of the requesting telephone set transduces the electrical signals into an audible message for the operator.

It is possible for an operator of a telephone set to miss part of a reply message. Also the buffer unit 30 temporarily stores the reply message until a new inquiry message is received. The telephone buffer unit 30 is arranged for rereading the temporarily stored characters of the reply message until the operator hangs up the receiver. Each time the characters are read out, the telephone terminal unit 28 encodes the characters of the message to electrical signals capable of being transduced into an audible message for operator observation. When the operator is satisfied that he has heard the message completely and correctly, he hangs up the receiver of the telephone set 26 and the telephone terminal unit 28 and the telephone 26 are disconnected by the telephone exchange 28.

The telephone set 27 operates in the system similar to the telephone set 26 except that the telephone exchange 29 is eliminated and a direct connection is provided to the terminal unit 28 eliminating any time sharing of terminal units. An arrangement such as that of telephone set 27 may be employed where a private telephone inquiry without time sharing is desired.

*Alternate inquiry system arrangement*

Figure 1A:
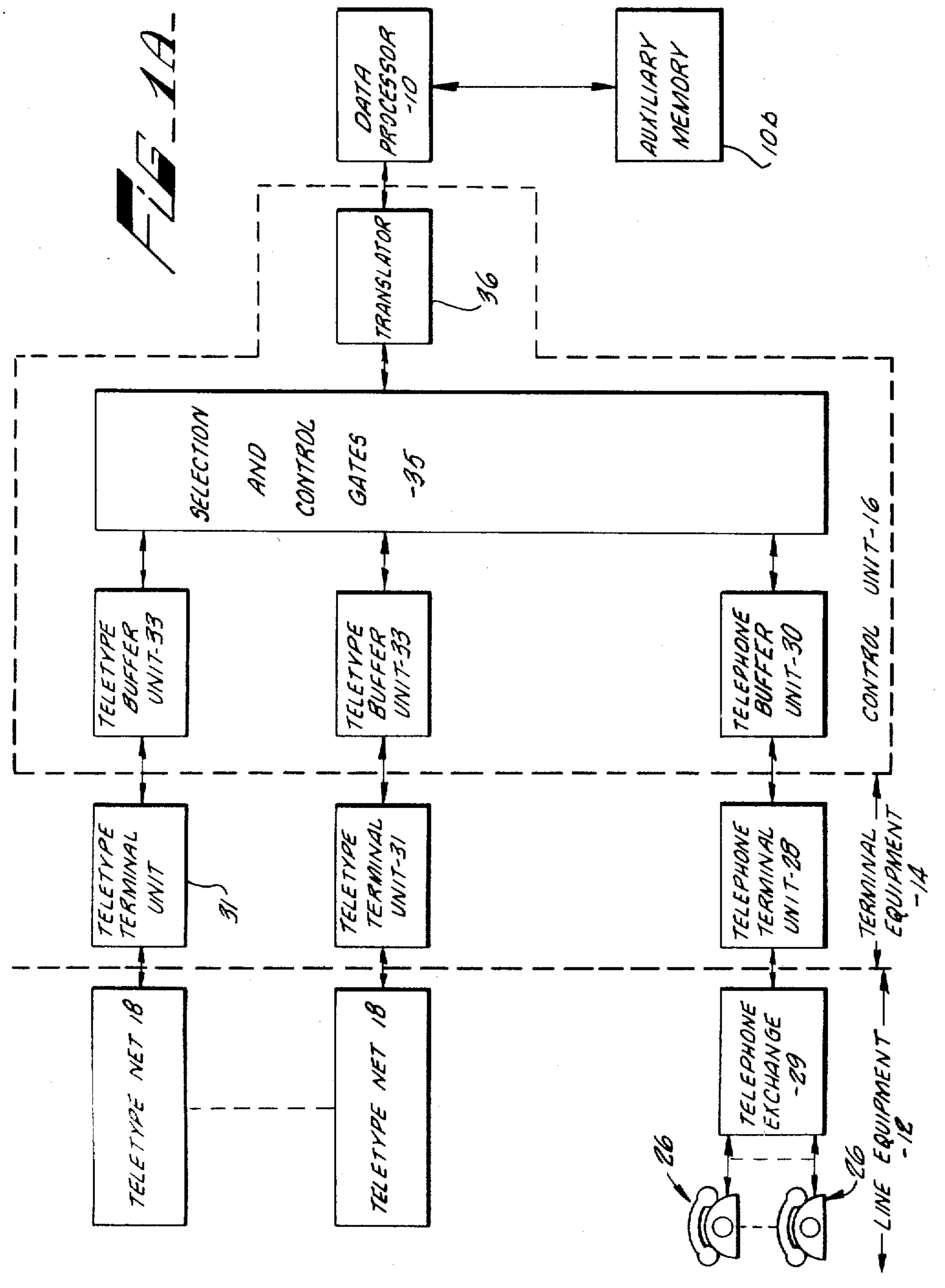
FIG. 1A is a general block diagram of an alternate arrangement of an inquiry system for a digital computer and embodying the present invention.

FIG. 1A shows a block diagram of an alternate inquiry system to that shown in FIG. 1 for use in making inquiries to a digital computer and which embodies the present invention. The overall block diagram of the inquiry system of FIG. 1A is quite similar to that shown in FIG. 1 except that a translator 36 is provided in the control unit 16 and connected between the selection and control gates and the digital computer 10. The translator 36 is provided for translating the five bit teletype coded characters provided by the teletype nets 18 into six bit coded characters for use by the digital computer 10. The arrangement of FIG. 1A is preferred to that shown in FIG. 1 in that the translation from teletype code is performed by a single translator whereas in the system of FIG. 1, a translator for converting between codes is needed in each teletype terminal unit 31.

In the inquiry system shown in FIG. 1A, an inquiry message is composed at one of the teletype nets 18 and provided to the corresponding teletype terminal unit 31. The inquiry message is composed of five bit teletype coded characters characterized as serial-by-bit, and including upper and lower shift characters commonly used in teletype systems. The teletype terminal unit 31 is different than the teletype terminal unit 20 shown in FIG. 1 in that the serial-by-bit teletype coded messages provided by the corresponding teletype net 18 are converted into serial-by-character and parallel-by-bit messages, and are provided to the corresponding teletype buffer unit 33 without code translation. It will be noted that the teletype terminal unit 20 of FIG. 1 not only converts the serial-by-bit teletype coded messages into serial-by-character parallel-by-bit messages but also translates the teletype coded message into computer coded messages.

Selection and control gates 35 in FIG. 1A operate similar to the selection and control gates 24 of FIG. 1 by sequentially scanning the buffer units in the control unit 16 until a buffer unit is found containing a complete inquiry message. When a buffer unit is found containing a complete inquiry message, the selection and control gates 35 in cooperation with one of the buffer units read out the inquiry message from the buffer unit and present the message a character at a time to the translator 36.

In the case of a teletype inquiry message, the characters of the message are translated from five bit teletype coded characters with upper and lower shift characters into six bit computer coded characters by the translator 36. The digital computer 10 stores the inquiry message and forms a reply message which is presented to the translator 36. The reply message is in computer code and characterized as serial-by-character parallel-by-bit. The translator 36 translates the six bit computer coded reply message into five bit teletype coded reply message containing upper and lower shift characters and presents the message a character at a time to the selection and control gates 35. The selection and control gates 35 couples the reply message back to the same teletype buffer unit 33 from which the inquiry message was received and the teletype buffer unit 33 stores the message a character at a time.

Subsequently, the teletype buffer unit 33 containing the reply message reads out the message and presents the message to the corresponding teletype terminal unit 31 which translates the message into a message containing teletype coded characters which are characterized as serial-by-bit and sends the message back to the requesting teletype station of the teletype net 18.

The telephone terminal units 28 in the telephone buffer unit 30 for the telephone inquiry system of FIG. 1A are identical to those shown in FIG. 1. In the case of a telephone inquiry, the selection and control gates 35 couple the output of a telephone buffer unit 30 containing an inquiry message to the input of the translator 36. However, since the telephone terminal unit 28 provides the code translation between telephone code and computer code, translation is unnecessary in the translator 36. Therefore, the translator 36 couples telephone inquiry messages directly to the digital computer 10 without translation. Similarly, when reply message to a telephone inquiry message is formed by the digital computer 10, the translator 36 couples the reply message back directly to the selection and control gates 35 without translation.

DETAILED DESCRIPTION

*Teletype set 18a*

Refer now to the details of the teletype stations 18*a* as shown in FIG. 1. The teletype stations 18*a* are standard Model 28 teletype second-receive page printers made by the Teletype Corporation. The teletype stations 18*a* have a keyboard and electrical circuits 18*c* (not shown) for allowing an operator to compose a message by striking keys on the keyboard. The keys of 18*c* each represent a character. Each time a key is struck by an operator, the electrical circuits of 18*c* of the teletype station 18*a* develop a series of teletype coded digital signals on the lines 18*b* representing the corresponding character. The signals set up on the lines 18*b* are sent serially-by-bit to the terminal equipment 14. In addition, each teletype station 18*a* has a typing unit 18*d* for receiving characters of a reply message on the lines 18*b*, each of the characters being represented by a series of teletype coded signals. The typing unit 18*d* prints a character on a page of paper for each character of the reply message in order to allow an operator to observe the reply message.

A stunt box 18*e* enables one teletype station in the teletype net 18 to be used by an operator for composing an inquiry message without observation by the other teletype stations 18*a* of the series teletype net 18. Such an arrangement is called selective calling and is a well-known feature for teletype systems. The selective calling system allows a prearranged sequence of character keys to be struck at one teletype station to select a particular teletype unit, and another sequence of character keys to be struck to terminate the communication with the selected teletype station. While a teletype station 18*a* is selected all of the other teletype stations 18*a* in the net may be placed in a nonselected condition wherein they are disabled. To be described in connection with FIG. 2, this technique of selective calling is used in order to allow any one of the teletype stations 18*a* of the series teletype net 18 to privately communicate with the terminal equipment 14.

*Teletype terminal unit 20*

Refer now to the detailed block diagram of the inquiry system shown in FIG. 2. The teletype terminal unit 20 contains a teletype send-receive page printer 20*a* identical to the teletype stations 18*a* shown in FIG. 1. In addition, the teletype unit 20*a* has code reading contacts 20*d*. The code reading contacts 20*d* set up a combination of open and closed switch contacts representing a character of the inquiry message sent to the teletype terminal unit 20 by one of the teletype stations 18*a*. The switch contacts of the code-reading contacts 20*d* are actuated by the type bars of the teletype send-receive page printer 20*a* and provide a parallel output signal in a five bit teletype code representing the character sent thereto. A code converter 20*e* translates the five bit teletype coded output signal of the code reading contacts 20*d* into a seven bit code for transmission to the data processor 10.

One bit of the seven bit output signal of the code converter 20*e* is a parity bit, the other six bits of the output signal from the code converter circuit 20*e* is a representation of the character of the inquiry message sent by the requesting inquiry station 18*a*. It should be noted that the teletype coded input signal to the code converter circuit 20*e* is in a five bit code. The extra bit (ignoring the parity bit) from the code converter circuit 20*e* is obtained by taking advantage of the upper shift and lower shift characters of a teletype station. Whenever an upper shift character is sent from a teletype station, the characters following are to be in upper case until a lower character is received. Similarly, whenever a lower case character is sent, the following characters are to be in lower case until an upper case character is received.

FIG. 3A shows the circuits of the teletype terminal control unit 20*g* for identifying and remembering the fact that an upper or a lower case character was previously sent from a teletype station to the teletype terminal unit 20. Refer now to FIGS. 3A. A decoder 40 is provided having two output circuits 40*a* and 40*b* connected to the input of a flip-flop circuit 42. The decoder circuit 40 has its input circuit connected to the five bit coded output of the code reading contacts 20*d* and applies a control signal at the output circuit 40*a* in response to an upper case character and a control signal at the output circuit 40*b* in response to a lower case character. The flip-flop circuit 42 is triggered into 1 and 0 states in response to control signals at the output circuits 40*a* and 40*b* respectively. Thus, after the decoder 40 has detected an upper case character, the flip-flop circuit 42 is in a 1 state, whereas after detecting a lower case character the flip-flop 42 is in a 0 state. The output circuits of the flip-flop 42 are connected to the code converter circuit 20*e* which uses the states of the flip-flop for converting the five bit teletype coded characters to six bit coded characters (neglecting the parity bit) which identifies whether the character is in upper or lower case.

The characters for reply messages from the buffer unit 22 are also in a six bit code. The six bit coded reply characters from the buffer unit 22 are translated back to five bit coded characters preceded by an upper or lower case shift character indicating the case of the characters. A code converter circuit 20*f* converts the six bit characters to five bit characters representing the reply characters which do not reflect the case of the characters. The teletype terminal control unit 20*g* recognizes a change in case of the characters being received from the buffer unit 22 and inserts the correct upper or lower case shift character in the string of characters being sent to the teletype unit 20*a*.

FIGURE 3B is a block diagram showing the circuits of the teletype terminal control unit 20*g* for controlling the conversion of characters from six bit to five bit codes. Refer now to FIG. 3B. A decoder 44 is provided for detecting upper and lower case characters from the buffer unit 22. A flip-flop circuit 48 is provided for detecting the state of the teletype unit 20*a*. The set=1 and reset=0 inputs of the flip-flop 48 are connected to upper shift control and lower shift control switches. The upper and lower shift control switches are actuated by internal actuating members of the teletype unit 20*a*. A compare circuit 46 compares the states of the flip-flop 48 with the case of the character detected by the decoder 44. Signal generators 50 and 52 are provided with their input circuits connected to the compare circuit 46 and the flip-flop 48. A gate 54 is provided with inputs connected to the output of the code converter 20*f* and an inverter circuit 55. Inverter circuit 55 has its input connected to the compare circuit 46. The signal generators 50 and 52 and the gate 54 each provide a 6 bit coded output signal. To be explained, only one of the circuits 50, 52 and 54 develops an output signal at any one instant in time. A gate 51 is provided for coupling the signal from whichever one of the circuits 50, 52 and 54 is applying a signal to the gate 51 to the teletype unit 20*a*.

A two-state counter 56 has its count input circuit connected to the output of the teletype unit 20*a* at which a signal is applied whenever the teletype unit 20*a* is ready to receive another character. A reset input circuit of the counter 56 is connected to the compare circuit 46. The OCRL1 output circuit of the teletype terminal unit 20 is connected to an AND gating circuit 58. The AND gating circuit 58 has its input circuits connected to the 0 output of the counter 56 and the output circuit of the teletype unit 20*a* which applies count signals to the counter 56. The counter 56 applies a control signal to the gate 58 whenever it is in state zero.

Whenever the teletype unit 20*a* receives a lower or an upper case shift character, it shifts to the corresponding upper or lower control state and remains in that state until the other type of shift character is received. When the teletype unit 20*a* shifts into a lower control state, a lower shift control switch is closed and causes the flip-flop 48 to be set into a 0 state. When the decoder circuit 44 detects an upper case character from the buffer unit 22, it applies a control signal to the compare circuit 46. Also, an upper shift control shift closes when the teletype unit is in an upper control state and causes the flip-flop circuit 48 to be set into a 1 state. When the decoder 44 detects a lower case character, no control signal is applied to the compare circuit 46. The compare circuit 46 applies a control signal at its output circuit whenever the decoder 44 detects an upper case character and the teletype unit 20*a* is in a lower control state (flip-flop 48 is in a 0 state). Also the compare circuit 46 applies a control signal at its output circuit when the decoder 44 detects a lower case character and the teletype unit 20*a* is in an upper control state (flip-flop 48 is in a 1 state). Thus, the compare circuit 46 applies a control signal at its output circuit in response to a difference in the case of a character from the buffer unit 22 and the control state of the teletype unit 20*a*.

A control signal at the output of the compare circuit 46 causes the counter 56 to be set into a 1 state. A 1 state of the counter 56 causes the gate 58 to inhibit a ready signal from the teletype unit 20*a*. The control signal at the output of the compare circuit 46 also causes the inverter circuit 55 and the gate 54 to disconnect the output of the code converter 20*f* from the gate 51.

A control signal at the output of the compare circuit 46 indicates that a different case character is being sent from the state of the teletype unit 20*a*. Therefore, either the signal generator 50 or the signal generator 52 must apply signals to the gate 51. If the flip-flop 48 is in a 0 state, it indicates that the teletype unit 20*a* is in a lower control state, hence an upper shift character must be sent to the teletype unit 20*a*. Accordingly, the signal generator 50 applies a five bit coded signal to the gate 51 representing an upper shift character. If the flip-flop 48 is in a 1 state, it indicates that the teletype unit 20*a* in an upper control state and that a lower shift character must be sent to the teletype unit 20*a*. Accordingly, the signal generator 52 applies a five bit coded signal to the gate 51 representing a lower shift character.

After the teletype unit 20*a* receives the shift signal and is ready to receive the next character, it applies a ready signal to the count input of the counter 56 and the gate 58. However, since the counter 56 is in state 1, the gate 58 inhibits the signal from being applied at the OCRL1 output circuit. The counter 56 is responsive to the ready signal for counting back to a 0 state of operation.

After the teletype unit 20*a* received the shift character, it shifted to the corresponding control state, therefore, the teletype unit 20*a* is now in the control state corresponding to the case of the character from the buffer unit 22. Also, the change in control state of the teletype unit 20*a* triggered the flip-flop 48 into the corresponding state of operation. The compare circuit 46 senses this condition and removes the control signal from its output circuit. This causes the inverter circuit 55 and gate 54 to couple the output of the code converter 20*f* to the gate 51 and the teletype unit 20*a* receives the 5 bit coded output of the code converter 20*f*. Since the gate 51 couples the code converter 20*f* to the teletype unit 20*a* the character (neglecting case) is then read by the teletype unit 20*a* and sent to the requesting teletype station. After the character is read by the teletype unit 20*a*, it sends a ready control signal to the gate 58. Since the counter 56 is now in state 0, the signal is coupled to the OCRL1 output circuit to the buffer unit 22. Subsequent characters of the same case are then coupled directly by the gates 54 and 51 from the code converter 20*f* to the teletype unit 20*a*. Also as subsequent characters of the same case are read by the teletype unit 20*a* and the ready control signal is applied to the gate 58, it is coupled directly to the OCRL1 output circuit.

A serializer 20*b* is provided in the teletype unit 20*a*. The serializer 20*b* converts the five bit character from the gate 51 (FIG. 3*b*) into a series of coded signals for transmission to the requesting teletype station.

*Telephone terminal unit 28*

Refer again to FIG. 2. The telephone terminal unit 28 has a telephone terminal control unit 100 and a voice encoder unit 150. The telephone control unit 100 includes a translating circuit for converting the serial pulses representing each digit dialed on a telephone set to a character of signals capable of being read by the telephone buffer unit 30 in parallel. The telephone terminal control unit 100 also includes circuits for providing a control signal at the GECL2 output circuit both at the beginning of each inquiry message and when an operator hangs up the receiver of a requesting telephone set. To be explained, in connection with the buffer unit 30 the control pulse pulse at the line GECL2 causes the timing circuits of the buffer unit 30 to be reset into an initial condition ready for an inquiry message. The voice encoder 150 provides the dial tones and converts the characters of reply messages to electrical signals capable of being transduced to an audible message by the speaker of the requesting telephone set.

Refer now to FIG. 4. A block diagram is shown of the telephone terminal control unit 100. At the left of FIG. 4 a simplified schematic representation is shown of the electrical circuits of a telephone set. The schematic representation consists of a battery connected in series with a dial switch and a receiver switch. The output terminals of the schematic representation are connected in parallel with a load resistor 102 in the connected telephone terminal control unit 100. The schematic representation is shown as it would electrically appear if the telephone exchange 28 were coupling the telephone set to the telephone terminal control unit 100.

The telephone terminal control unit 100 has a filter 104 connected across the load resistor 102. The output circuit of the filter 104 is connected to a switch 106 having its output circuit connected to the inputs of AND gates 107 and 114 and an inverter circuit 108. The output circuit of the AND gate 107 is connected through delay circuits 110 and 112 to other input circuits of the AND gate 114. The output circuit of the AND gate 114 is connected through a pulse former circuit 116 to a count input circuit of a counter 118. The output circuits of the delay circuits 110 and 112 are connected through inverter circuits 120 and 122 to the input circuit of an AND gate 124. The AND gate 124 has its output circuit connected to a reset input circuit of the counter 118. The output circuit of the delay circuit 112 and the inverter circuit 120 are connected to input circuits of an AND gate 126. The output circuit of the AND gate 126 is connected to the ICRL2 output circuit (FIG. 2).

The output circuit of the inverter circuit 108 is connected through a delay circuit 109 to the input circuits of the AND gates 107 and 126 and a pulse generator 128. The output circuit of the pulse generator 128 is connected to the GECL2 output circuit (FIG. 2).

The delay circuits 109, 110 and 112 are responsive to a control signal applied at their respective input circuits for applying a control signal at their output circuits. The delay circuits 109, 110 and 112 have time delays of .5 second, .1 second, and .12 second, respectively. After the control signal is removed from the input circuits, the time delay circuits maintain the control signals at the output circuits thereof for the respective delay periods.

Refer now to the operation of the telephone terminal control unit 100. Assume initially that no inquiry requests are being placed. All of the telephone receivers are in place on the respective telephone sets and as a result the telephone receiver switch of the set connected to the telephone terminal unit 100 is open. An open circuit across load resistor 102 causes a control signal at the output of switch 106. However, the inverter circuit 108 inverts the control signal and as a result no control signal is applied to the time delay circuit 109. Therefore, the time delay circuit 109 does not apply a control signal to the gate 107 and gate 107 inhibits any signals from being applied to the delay circuits 110 and 112.

Assume now that an operator lifts the receiver of a telephone set. This causes the receiver switch of the telephone set to close, and the battery to be connected across the load resistor 102. The battery voltage across the load resistor 102 causes the switch 106 to remove the control signal applied to the gates 107 and 114 and the inverter circuit 108. With these input conditions the AND gate 107 still does not apply a control signal to the delay circuits 110 and 112 but the inverter circuit 108 applies a control signal to the delay circuit 109. As a result, the delay circuits 110 and 112 do not apply control signals to inverter circuits 120 and 122. These conditions cause the inverter circuits 120 and 122 to apply control signals to the gate 124 which in turn applies a control or reset signal to the counter 118. The reset signal to the counter 118 causes it to be reset into an initial zero state of operation.

As indicated, the inverter circuit 108 applies a control signal to the delay circuit 109, beginning when an operator picks up a receiver and terminating when he hangs up the receiver. The delay circuit 109 is a conventional delay circuit arranged for forming a control signal commencing with the input control signal and terminating only after a .5 second delay after the termination of the input control signal.

The pulse generator 128 is arranged to provide a control pulse both at the beginning of the control signal provided by the delay circuit 109 and at the termination thereof. The control pulses formed by the pulse generator 128 are applied to the output circuit GECL2.

Assume now that the operator of the requesting telephone set dials a digit 5. As the dial starts returning to its initial position, the dial switch opens and closes five times. Each time the dial switch opens, the switch 106 applies a control pulse to the gates 107 and 114 and the inverter circuit 108. Since the delay circuit 109 now applies a control signal to the gate 107 each control pulse from the switch 106 is applied to the delay circuits 110 and 112. The first one of the five control pulses sets the delay circuits 110 and 112 into timing cycles. All of the control pulses are shorter than .1 second and the delay circuits 109 and 112 do not time out but maintain the control signals at the output circuits thereof. The control signals at the outputs of the delay circuits 110 and 112 cause the gate 114 to couple the control signals from the switch 106 to the pulse former circuit 116. The pulse former circuit 116 in turn applies count or control signals to the counter 118. Thus, the counter 118 counts the dial pulses from the requesting telephone set.

Assume now that the dial at the requesting telephone set has returned to its initial position and the last control pulse has been applied to the delay circuits 110 and 112. At the end of a .1 second delay, the delay circuit 110 removes the control signal from the inverter circuit 120 and the gate 114. This causes a control signal at the output of the inverter circuit 120. Since the delay circuits 112 and 109 are still applying control signals to the AND gate 126, the control signal at the output of the inverter circuit 120 causes the gate 126 to apply a control signal at the ICRL2 output circuit. It should be noted that the control signal at the ICRL2 output circuit indicates that the counter 118 is now in a state representing the character dialed on a telephone set and that the state of the counter 118 may be read by the buffer unit 30.

After a .12 second delay from the end of the last dial pulse (and control pulse) of a dialed digit, the delay circuit 112 removes the control signal from the inverter circuit 122. At this point, neither of the inverter circuits 120 and 122 receives a control signal; therefore, both apply control signals to the gate 124 causing a reset signal to be applied to the counter 118, and causing the control signal to be removed from the line ICRL2. The reset signal to the counter 118 resets the counter to its initial zero state ready for the next digit to be dialed by the operator.

When an operator has finished dialing the characters of this inquiry message and hangs up the receiver of the telephone set, the receiver switch again opens and an open circuit again appears across the load resistor 102, causing the switch 106 to apply a constant control signal to the inverter circuit 108. The inverter circuit in turn removes the control signal from the delay circuit 109. After a .5 second delay from the end of the control signal to the delay circuit 109, the delay circuit 109 removes the control signal from the gate 107 preventing further control signals from being applied to the delay circuits 110 and 112. The change from a control signal to no control signal causes the pulse generator 128 to again apply a control pulse at the output circuit GECL2.

Refer now to the voice encoder 150. Two tone oscillator circuits 148 and 149 are provided for applying electrical signals, capable of being transduced into audible tones on the two wires going to the telephone exchange 29. The tones inform the operator what point he is in in dailing an inquiry message. The tone oscillator 148 provides an electrical signal of a first frequency when the operator is dialing his inquiry message. After the ten digits of a complete inquiry message have been dialed, the oscillator 148 is switched off and the oscillator 149 is switched on and provides an electrical signal of a second frequency. Thus, the second frequency electrical signal indicates to the operator that he has dialed a complete message of ten digits, and if the digits he dialed are correct, he may dial one more digit of any value. The eleventh digit causes the previously dialed ten digits to be read out of the buffer unit 30 for the data processor 10. If the operator has made a mistake in dialing the inquiry message, he may hang up the receiver before dialing the eleventh digit and terminate the inquiry request. Subsequently, the operator may pick up the receiver, establish connection with the terminal unit and redial the digits of the inquiry message. Control of the oscillators 148 and 149 is provided by two control circuits T1 and T2, respectively, from the buffer unit 30.

Refer now to the means for translating characters of the reply message into electrical signals capable of being transduced into an audible message shown in FIG. 5 and which is a part of the voice encoder 150. A recording means 152 is provided which includes a magnetic recording disk 156 driven by a motor 158. The recording means 152 also includes a means 160 for detecting the beginning of a message component on the recording disk and a motor control circuit 166. The motor control circuit 166 includes a relay 168 for coupling a source of power 167 to the motor 158 whenever a control signal is applied at the ODF2 output circuit of the buffer unit 30. The motor 158 is responsive to power from the source of power 167 for rotating the magnetic recording disk 156.

The recording disk 156 itself has a conventional magnetic recording surface similar to the type used for magnetic recording drums which revolves immediately beneath a reading head assembly 154. Each reading head **154*a* of the reading head assembly 154 defines a separate track having a prerecorded phonic message component capable of being read by the corresponding reading head and transduced into an electrical signal capable of being transduced into an audible message. Each reply character from the data processor 10 represents the phonic message component in one of the tracks on the disk 156**.

The output circuits of the reading heads 154 are connected through a head selection circuit 168 (see FIG. 2) to the pair of telephone lines connected to the telephone exchange 29. The head selection circuit 168 is a conventional relay switching circuit of one of the types well known in the computer art of the type utilized with a magnetic drum for example. The head selection circuit 168 is responsive to each character of signals applied thereto by the corresponding buffer unit 30 for connecting the output signal of the reading head **154*a*, which is reading the content of the track corresponding to the character to the telephone lines connected to the telephone exchange 29. The speaker 26*b* of the telephone set connected to the telephone lines in turn transduces the electrical signals from the read head into an audible phonic message component for the operator. The read head 154*a* and the selection circuit 168 form a means for reading the message components from the recording disk 156**.

Thus, each track on the disk 156 contains a phonic message component representing a part of a message. The components are such that by reading and transducing different ones in different orders, various complete messages may be composed. By reading the output of the read heads associated with the tracks corresponding to all of the characters contained in each reply message, a complete audible message composed of the phonic message components is composed for listener observation by one of the speakers **26*a* or 27*a***, and the listener receives the data processor reply message in audible form.

The means 160 for detecting the beginning of a message component on the magnetic recording disk 156 includes a switch 161 and a switch actuator 162 and a source of potential 163. Each of the phonic message components on the magnetic recording disk 156 is recorded beginning along a radial line of the magnetic recording disk. The switch actuator 162 is positioned in relation to the beginning of the message components such that it actuates the switch 161 whenever the read head assembly 164 is positioned at the beginning of the message components. When the switch 161 is actuated the source of potential 163 is coupled to the OCRL2 line to the buffer unit 30.

Other details of the voice encoder 160 are shown and described in the above-mentioned patent application entitled "Voice Encoder" by Fox.

*Control unit 16*

The teletype and telephone buffer units 22 and 30 are similar except as hereinafter noted. Therefore, a description will be given of the teletype buffer unit 22 and only pointing out the differences between it and the telephone buffer unit 30. All flip-flop circuits and counters are synchronized with clock pulses from a source 172 (see FIGS. 1 and 2). The source of clock pulses 172 is a part of the control unit 16.

Refer now to the teletype buffer unit 22 as shown in FIG. 2. The teletype buffer unit 22 includes a buffer memory 200 and a buffer control unit 210. The buffer memory 200 has a core memory 202 for storing the inquiry and reply messages. An information register 204 is provided with the core memory 202 and is the register utilized for storing each character before it is stored in the core memory 202 and for storing a character after it is read out of the core memory 202 before distribution to the other units in the system. A gate 203 is provided for gating a character of a reply message from the data processor 10 into the information register 204. A gate 205 is provided for gating a character of an inquiry message from the teletype terminal unit 20 into the information register 204. A memory timing unit 206 is provided for sequencing the operation of the core memory 202.

Refer now to the memory timing circuit 206. The memory timing circuit 206 has an input circuit connected to the buffer control circuits 210, and referenced by the symbol SMCL1. FIG. 8 is a timing diagram illustrating the sequence of operation of the memory timing unit 206. A control signal on the line SMCL1 in coincidence with a clock pulse causes a read pulse to be developed followed by a write pulse. The memory timing unit 206 also has a control circuit connected to the OUF1 output circuit of the buffer control 210. If a signal is applied at the output circuit OUF1, the memory timing unit 206 develops a strobe pulse in coincidence with the read pulse. The read pulse causes the memory 202 to read out a character of a message stored therein. The write pulse causes a character of a message stored in the information register 204 to be written in the core memory 202. The strobe pulse causes the character read out of the core memory 202 to be stored in the information register 204.

It should be noted that the core memory 202 does not lose a character even though it is destructively read. The character read out of the core memory 202 is stored in the information register 204 by the strobe pulse. The following write pulse causes the character read out of the core memory 202 and stored in the information register 204 to be written back in the same memory location from which it was read.

An address counter 208 is provided for specifying the address from which a character stored in the core memory 202 is to be read out and for specifying which memory location a character stored in the information register 204 is to be written. The address counter 208 has an input circuit, referenced by the symbol CT.AL1, connected to the buffer control unit 210. A control signal at the output circuit CT.AL1 causes the address counter 208 to count from one state to the next in response to a clock pulse.

The information register 204 has seven flip-flop circuits. Proceeding from the flip-flop for storing the most significant bit of a character to the least significant bit, the flip-flop circuits of the information register 204 are represented by the symbols IPFF1, IBFF1, IAFF1, I8FF1, I4FF1, I2FF1, and I1FF1. FIG. 2C is a diagram showing the output circuits of the flip-flops of the information register 204.

The buffer memory 200*a* of the telephone buffer unit 30 is similar to the buffer memory 200 of the teletype buffer unit 22, however, the flip-flops of the information register are represented by a symbol with the number 2 following rather than a number 1. Also, a reference number 2 is placed in front of the symbols SMCL, CL.AL and CTAL in order to distinguish them from the corresponding symbols of the buffer memory 200. The reference number for each of the other elements of the buffer memory 200 are represented by the same symbols as the buffer memory 200 except that the letter *a* follows the reference numbers.

Refer now to the buffer control unit 210. The buffer control unit 210 has five flip-flop circuits referenced by the symbols ACFF1, FLFF1, ODFF1, HOFF1, and OUFF1. Control logic 212 is provided for applying control signals to the buffer memory 200, the selection and control gates 24, and the teletype terminal unit 20.

Figure 6A:
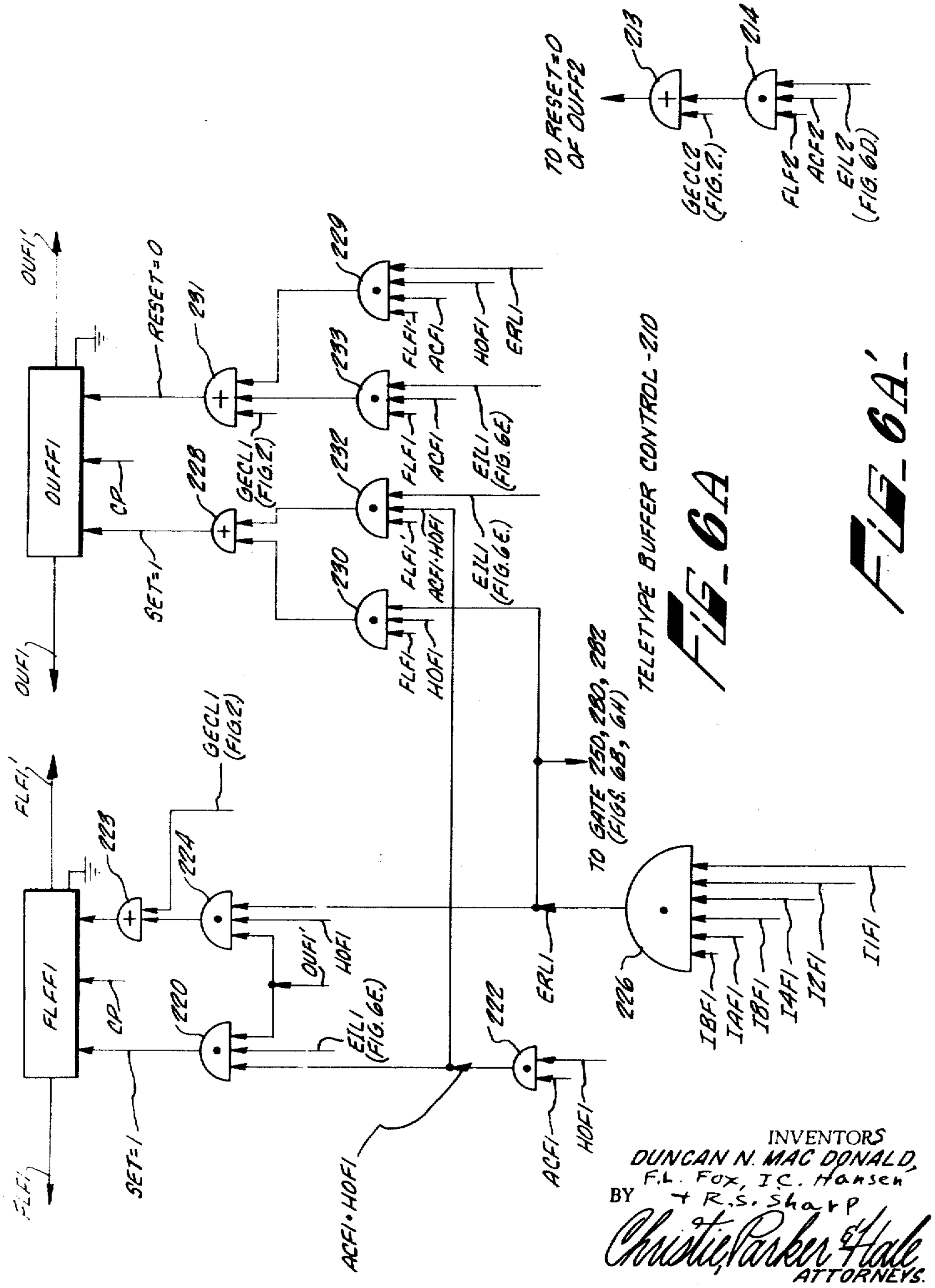
Figure 6B:
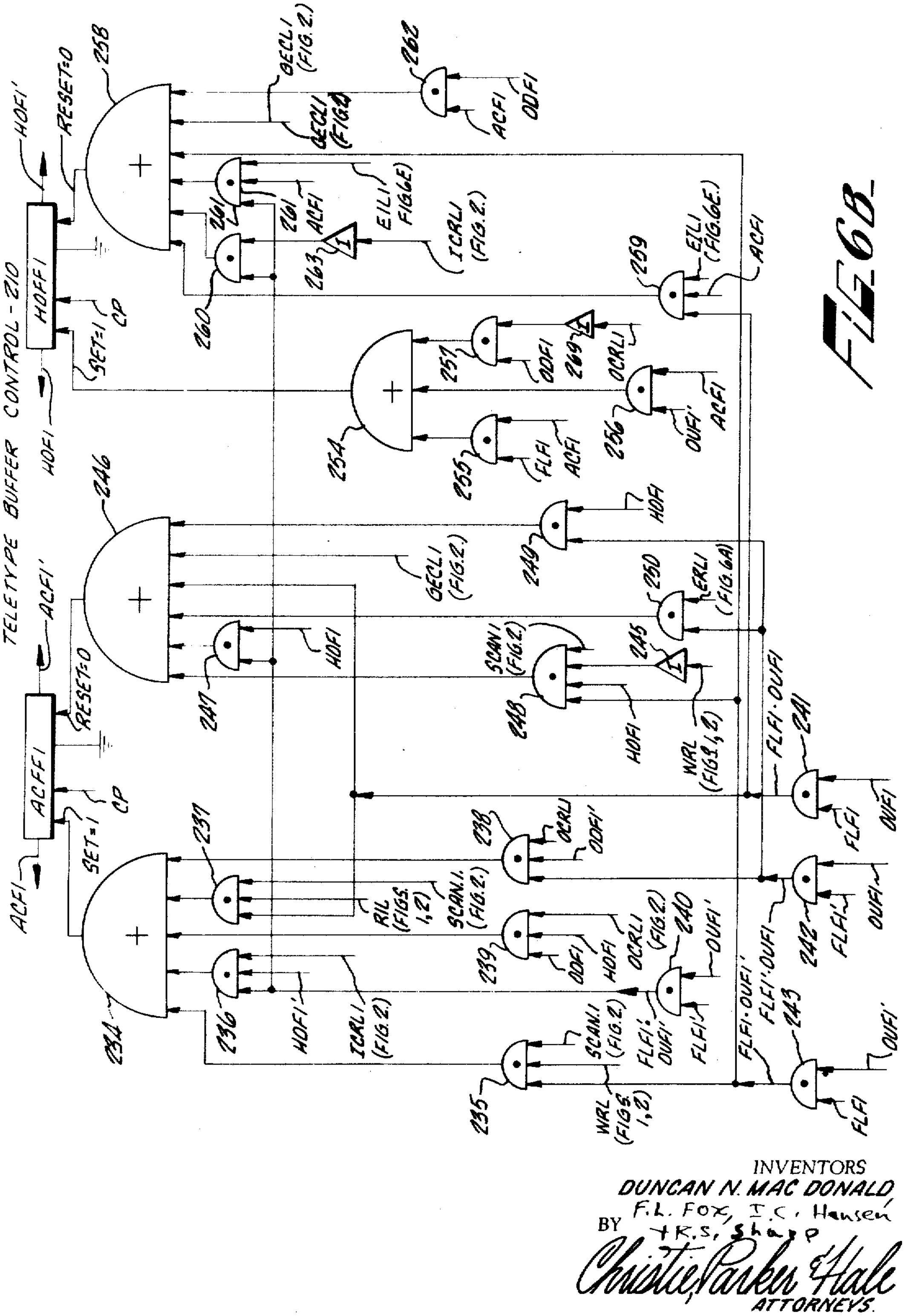
Figures 6C, 6D, 6E, 6F, 6G:
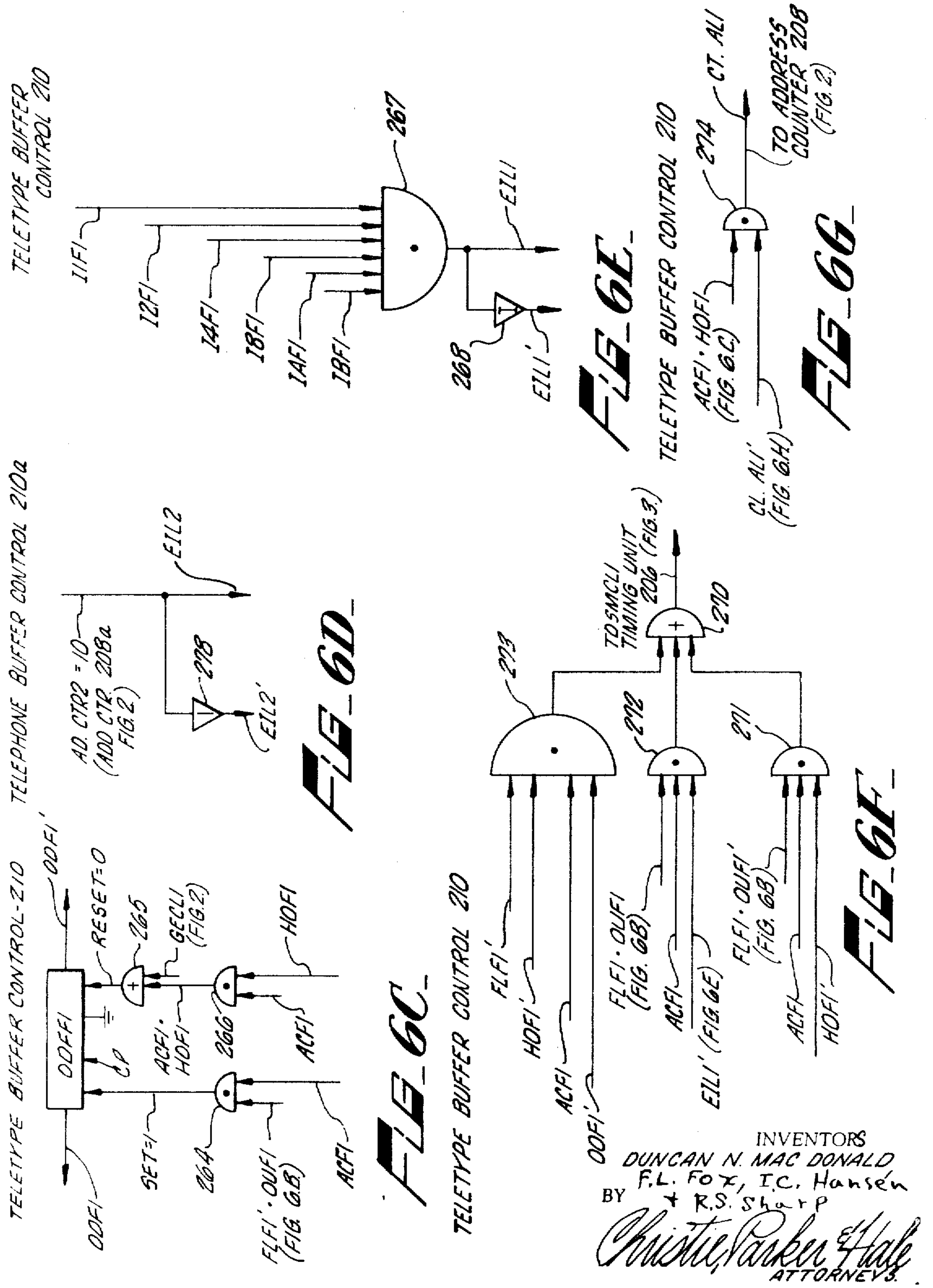

Refer now to the details of the gating circuits of the buffer control unit 210 as shown in FIGS. 6A through 6I. FIGS. 6A through 6C show the input and output circuits of the flip-flops along with the gating circuits for setting the flip-flop circuits of the buffer control 210 into their states of operation. Refer specifically to FIG. 6A. The flip-flop circuit FLFF1 has two output circuits referenced by the symbols FLF1 and FLF1'. The FLFF1 flip-flop also has two input circuits referenced by the symbols set=1 and reset=0. A control signal at the set=1 input circuit of the FLFF1 flip-flop causes it to be set into a 1 state. In a 1 state the FLFF1 flip-flop develops a control signal at the FLF1 output circuit. Similarly, a control signal at the reset=0 input circuit causes the FLFF1 flip-flop to be set into a 0 state wherein a control signal is developed at the FLF1' output circuit thereof. Similar terminology and symbol representation are used for the other flip-flop circuits of the buffer control 210.

Refer now to the gating circuits for triggering the flip-flop FLFF1 into its 1 state of operation. The set=1 input of the FLFF1 flip-flop is connected to the output of an AND gating circuit 220, having an input circuit connected to an AND gating circuit 222. The AND gate 220 also has input circuits connected to the output circuits OUF1' and EIL1 (see FIG. 6E). The AND gating circuit 222 has its input circuits connected to the output circuits ACF1 and HOF1. The output circuit of the gating circuit 222 is hereinafter referred to by the symbol ACF1.HOF1. The reset=0 input of the FLFF1 flip-flop is connected to the output of OR gating circuit 223. The gating circuit 223 has its input circuits connected to an output circuit GECL1 (see FIG. 2) and the output of an AND gating circuit 224, having an input circuit connected to the output of an AND gating circuit 226. The gating circuit 224 has other input circuits connected to the output circuits OUF1' and HOF. The gating circuit 226 has input circuits connected to the output circuits IBF1 through I1F1 of the information register 204 (see FIG. 2).

The end of inquiry character is a character composed of all 1 bits. The gate 226 develops a control signal whenever the information register 204 is storing an end of inquiry character. The output circuit of the gating circuit 226 is hereinafter referred to as the ERL1 output circuit, and is used as inputs for other gating circuits of the buffer control logic 212.

The set=1 input circuit of the OUFF1 flip-flop is connected to the output circuit of an OR gating circuit 228. The OR gating circuit 228 has input circuits connected to the output circuits of AND gating circuits 230 and 232. The AND gating circuit 230 has its input circuits connected to the output circuits FLF1, HOF1 and ERL1. The AND gating circuit 232 has its input circuits connected to the output circuits FLF', ACF1.HOF1, and EIL1 (see FIG. 6E). The reset=0 input circuit of the OUFF1 flip-flop is connected to the output circuit of an OR gating circuit 231. The gating circuit 231 has its input circuits connected to the output circuits of AND gates 233 and 229 and to the output circuit GECL1 of the teletype terminal unit 20 (FIG. 2). The gate 233 has input circuits connected to the output circuits FLF1, ACF1 and EIL1. The gate 229 has input circuits connected to the output circuits FLF', ACF1, HOF1 and ERL1.

The input circuits of the OUFF2 flip-flop of the buffer control 210A are identical to that of the OUFF1 flip-flop of the buffer control 210, except for the gates of the reset input circuit thereof. FIG. 6A' shows the gating circuits for the reset=0 input circuit and the OUFF2 flip-flop. As indicated, the reset=0 input circuit is connected to an OR gate 213. The gate 213 has its input circuits connected to the output circuit GECL2 (FIG. 2) and the output circuit of an AND gating circuit 214. The gating circuit 214 has its input circuits connected to the output circuits FLF2, ACF2 and EIL2 (FIG. 6D).

FIG. 6B shows the gating circuits for controlling the setting of the ACFF1 and HOFF1 flip-flops of the control unit 210. The set=1 input of the ACFF1 flip-flop is connected to an OR gating circuit 234 having input circuits connected to the output circuits of AND gating circuits 235, 236, 237, 238 and 239. The gating circuit 236 has input circuits connected to the output circuit of an AND gating circuit 240 and the output circuit HOF1' and ICRL1 (see FIG. 2). The gating circuit 235 has input circuits connected to the output circuit of an AND gating circuit 243 and the output circuits WRL (see FIGS. 1 and 2) of the data processor 10 and the SCAN.1 (see FIG. 2) output circuit of the scan counter 170. A control signal applied at the output circuit WRL of the data processor 10 indicates that it is ready to reply to an inquiry message by supplying characters of a reply message to the buffer. The gating circuit 237 has its input circuits connected to the output circuit RIL (FIG. 2) of the data processor 10 and SCAN.1 (FIG. 2) and the output circuit of an AND gating circuit 241. A control signal applied at the RIL output circuit by the data processor 10 indicates that it is ready to receive an inquiry message. The gating circuit 238 has its input circuits connected to the output circuits ODF1' and OCRL1 (see FIG. 2) and the output circuit of an AND gating circuit 242. The gating circuit 239 has its input circuits connected to the output circuits ODF1, HOF1, and OCRL1 (FIG. 2). The AND gating circuit 240 has its input circuits connected to output circuits FLF1' and OUF1'. The output circuit of the gating circuit 240 is hereinafter referred to as the output circuit FLF1'.OUF1'. The gating circuit 241 has its input circuits connected to the output circuits FLF1 and OUF1. The output circuit of the gating circuit 241 is hereinafter referred to as the FLF1.OUF1 output circuit. The input circuits of the gating circuit 242 are connected to the output circuits FLF1′ and OUF1. The output circuits of the gate 242 is hereinafter referred to as the FLF1′.OUF1 output circuit. The AND gating circuit 243 has its input circuits connected to the output circuits FLF1 and OUF1′. The output circuit of the gate 243 is hereinafter referred to as the FLF1.OUF1′ output circuit.

The reset=0 input circuit of the ACFF1 flip-flop is connected to the output of an OR gating circuit 246. The OR gating circuit 246 has its input circuits connected to the gates 247, 248, 249, 250 and 241 and the output circuit GECL1 (FIG. 2). The gating circuit 247 has its input circuits connected to the output circuits FLF1′.OUF1′ and HOF1. The gating circuit 248 has its input circuits connected to the output circuits FLF1.-OUF1′, HOF1, and SCAN.1 (FIG. 2) and the output of an inverter circuit 245 having its input circuit connected to the output circuit WRL (FIG. 2). The gating circuit 249 has its input circuits connected to the output circuits FLF1′.OUF1 and HOF1. The AND gating circuit 250 has its input circuits connected to the output circuits FLF1′.OUF1 and ERL1 (FIG. 6A).

Refer now to the gating circuits for the HOFF1 flip-flop. The set=1 input circuit of the HOFF1 flip-flop is connected to the output of an OR gating circuit 254 having input circuits connected to AND gating circuits 255, 256 and 257. The AND gating circuit 255 has its input circuits connected to the output circuits FLF1 and ACF1. The gating circuit 256 has its input circuits connected to the output circuits OUF1′ and ACF1. The AND gating circuit 257 has its input circuits connected to the output circuit of an inverter circuit 269 and the output circuit ODF1. The input circuit of the inverter circuit 269 is connected to the output circuit OCRL1. The reset=0 input circuit of the HOFF1 flip-flop is connected to an OR gating circuit 258 having input circuits connected to the output circuits of AND gating circuits 259, 260, 261 and 262. In addition, the gating circuit 258 has input circuits connected to the output circuits FLF1.OUF1′ and GECL1 (FIG. 2). The gating circuit 259 has its input circuits connected to the output circuits FLF1.OUF1, ACF1 and EIL1 (FIG. 6E). The gating circuit 260 has its input circuits connected to the output circuit FLF1′.OUF1′ and the output circuit of an inverter circuit 263. The inverter circuit 263 has its input circuit connected to the output circuit ICRL1 (FIG. 2). The gate 261 has its input circuits connected to the output circuits FLF1′.OUF1′, ACF1 and EIL1 (FIG. 5E). The gate 262 has its input circuits connected to the output circuits ACF1 and ODF1.

Refer now to FIG. 6C wherein the gating circuits for controlling the setting of the ODFF flip-flops are shown. The set=1 input of the ODFF1 flip-flop is connected to the output circuit of an AND gating circuit 264. The gating circuit 264 has input circuits connected to the output circuits FLF′.OUF1 (FIG. 6B) and ACF1. The input circuit of the ODFF1 flip-flop for resetting it into a zero state is connected to an OR gating circuit 265 having input circuits connected to the output circuit of an AND gating circuit 266 and the output circuit GECL1 (FIG. 2). The gate 266 has its input circuits connected to the output circuits ACF1 and HOF1.

Refer now to FIG. 6E wherein the gate for applying the control signal at the output circuit EIL1 is shown. A gate 267 applies the control signals at the output circuit EIL1. The input circuits of the gating circuit 267 are connected to the output circuits IBF1 through I1F1 of the information register 204 (FIG. 2). An inverter circuit 268 inverts the output signal at EIL1 and provides a complementary output signal at the output circuit EIL1′.

The output circuits EIL2 and EIL2′ are the output circuits of the telephone buffer unit 30 corresponding to EIL1 and EIL1′ of the teletype buffer 22. FIG. 6D shows the circuit to be used for providing signals at the output circuits EIL2 and EIL2′ in the telephone buffer unit 30. The output circuit EIL2 is connected directly to the output circuit AD.CTR2=10 of the address counter 208*a* (FIG. 2). The output circuit EIL2′ is connected to the output circuit AD.CTR2=10 through a signal inverter circuit 278.

FIG. 6F shows the gating circuits for applying the control signal at the SMCL1 output circuit. As described in connection with FIG. 2, a control signal at the SMCL1 output circuit causes the memory timing unit 206 to start a memory timing cycle. The SMCL1 output circuit is connected to an OR gating circuit 270. The gating circuit 270 has its input circuits connected to the output circuits of AND gating circuits 271, 272 and 273. The gating circuit 271 has its input circuits connected to the output circuit HOF1′, ACF1 and FLF1.OUF1′ (FIG. 6B). The gating circuit 272 has its input circuits connected to the output circuits EIL1′ (FIG. 6E), ACF1, and FLF1.OUF1 (FIG. 6B). The gating circuit 273 has its input circuits connected to the output circuits ODF1′, ACF1, HOF1, and FLF1′.

FIG. 6G shows the gating circuits for applying the control signals at the CT.AL1 output circuit. The output circuit CT.AL1 is connected to an AND gating circuit 274. The gating circuit 274 has its input circuits connected to the output circuits CL.AL1′ (see FIG. 6H), and ACF1.HOF1 (FIG. 6C).

Figures 6H, 6I, 6J, 6K:
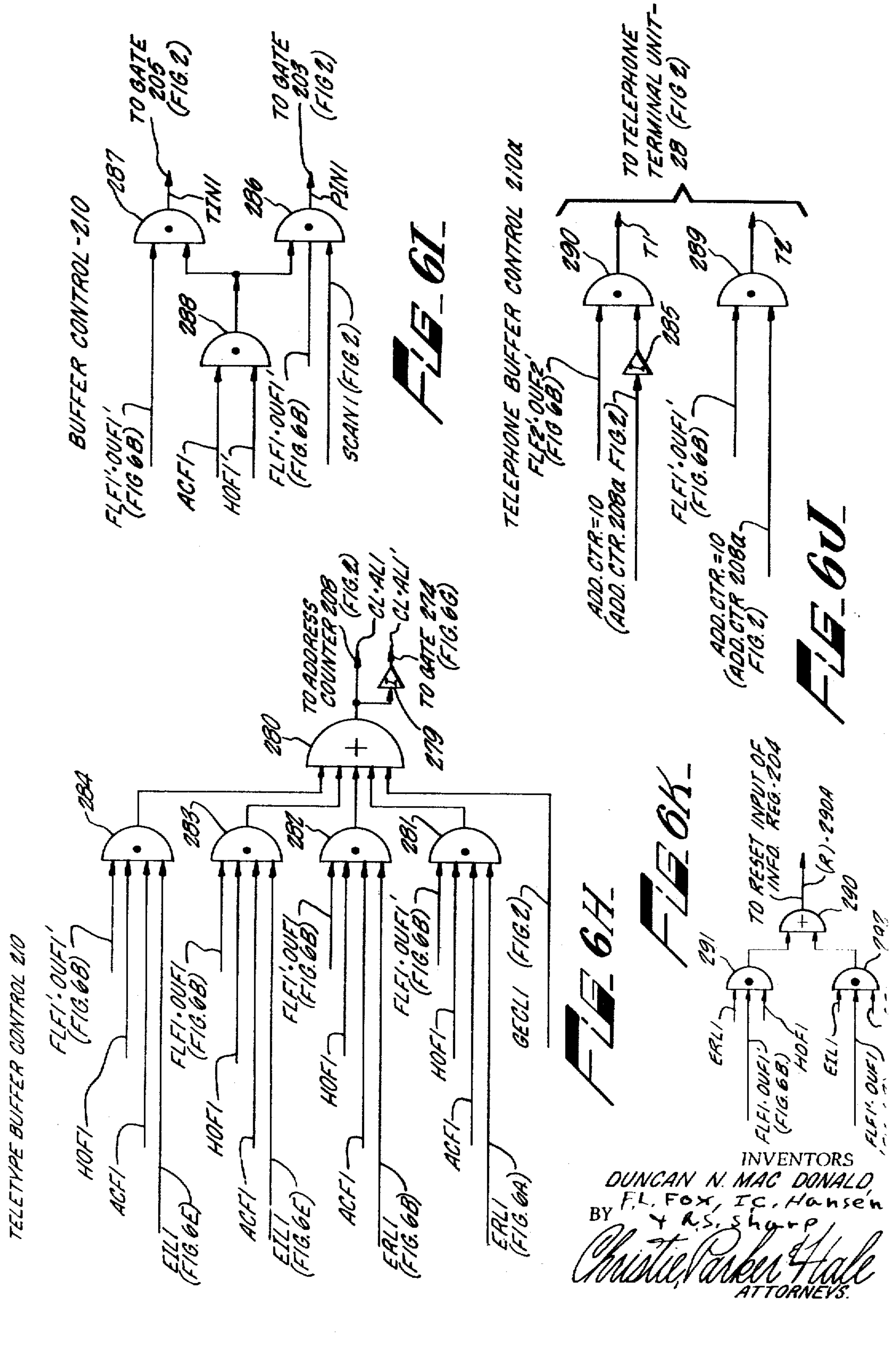

Refer now to FIG. 6H wherein the gating circuits for providing control signals at the output circuit CL.AL1 are shown. The CL.AL1 output circuit is connected to an OR gating circuit 280. The OR gating circuit 280 has its input circuits connected to the output circuit GECL1 (FIG. 2) and the output circuits of AND gating circuits 281 through 284. The AND gating circuit 281 is connected to the output circuits ERL1 (FIG. 6A), ACF1, HOF1, and FLF1.OUF1′ (FIG. 6B). The input circuits of the gating circuit 282 are connected to the output circuits ERL1 (FIG. 6B), ACF1, HOF1, and FLF1′.OUF1 (FIG. 6B). The AND gating circuit 283 has its input circuits connected to the output circuits EIL1 (FIG. 6E), ACF1, HOF1, and FLF1.OUF1 (FIG. 6B). The gating circuit 284 has its input circuits connected to the output circuits EIL1 (FIG. 6E), ACF1, HOF1, and FLF1′.OUF1′ (FIG. 6B).

Refer now to FIG. 6I wherein the gating circuit of the teletype buffer control unit 210 for applying control signals at the output circuits TIN1 and PIN1 are shown. The output circuits PIN1 and TIN1 provide the control signals to the gates 203 and 205 (FIG. 2). The output circuit PIN1 is connected at the output circuit of an AND gating circuit 286. The AND gating circuit 286 has its input circuits connected to the output circuits FLF1.OUF1′ (FIG. 6B), SCAN.1 (FIG. 2), and the output circuit of an AND gating circuit 288. The output circuit TIN1 is connected at the output circuit of an AND gating circuit 287. The AND gating circuit 287 has its input circuits connected to the output circuits FLF1′.OUF1 (FIG. 6B) and the output circuit of the AND gating circuit 288. The gating circuit 288 has its input circuits connected to the output circuits ACF1 and HOF1′.

The circuits of FIG. 6J are provided in the telephone buffer control 210*a*, whereas no comparable circuit is provided in the teletype buffer control 210. As pointed out in connection with FIG. 2, the output circuit T1 and T2 provide the control signals to the oscillator circuits 148 and 149 of the voice encoder 150. Referring now to FIG. 6J, the T1 output circuit is connected to an AND gating circuit 290. The gating circuit 290 has its input circuits connected to the output circuits FLF2′.OUF2′ (FIG. 6B) and the output circuit of an inverter 285. The inverter 285 has its input connected to the output circuit ADD.CTR2=10 (ADD.CTR.208*a*, FIG. 2). The output circuit T2 is connected to an AND gating circuit 289. The gating circuit 289 has its input circuits connected to the output circuits FLF2.OUF2' (FIG. 6B) and ADD. CTR2=10 (ADD.CTR.208*a*, FIG. 2).

The information register 204 contains an end of inquiry character and an end of reply character at the end of modes 1 and 3, respectively. These characters must be cleared out of the register for proper operation of the logical circuits. To this end, the circuits of FIG. 6K are provided for resetting the information register 204 and causing a character zero to be stored therein.

Referring now to FIG. 6K an OR gate 290 is provided having two input circuits connected to AND gating circuits 291 and 292. The AND gating circuit 291 has inputs connected to the output circuits ERL1 (FIG. 6A), FLF1. OUF1' (FIG. 6B) and HOF1. The gating circuit 292 has inputs connected to the output circuits EIL1 (FIG. 6E), FLF'.OUF' (FIG. 6B) and HOF1.

Figure 7D:
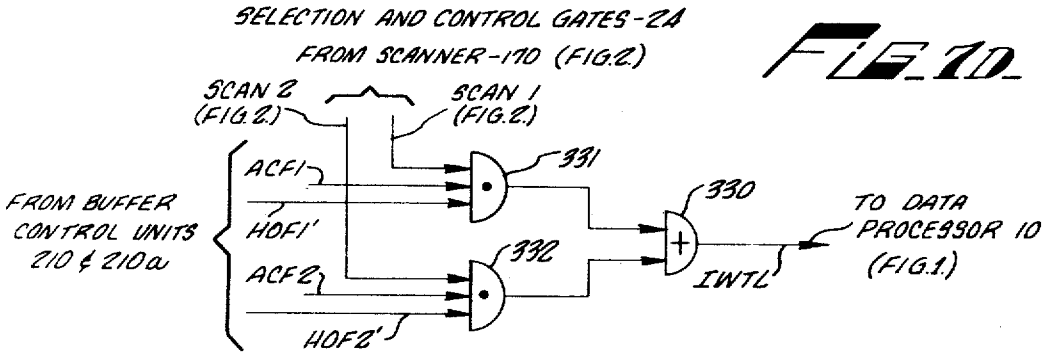
Figure 7E:
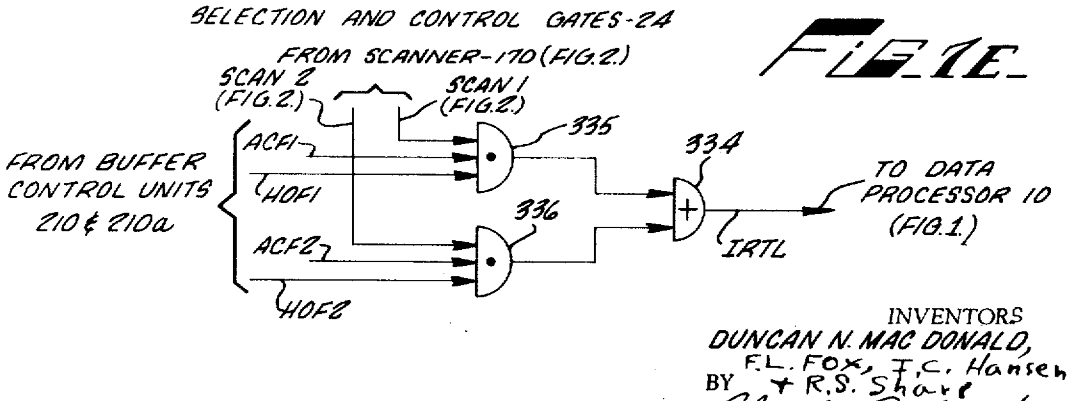
Figure 7A:
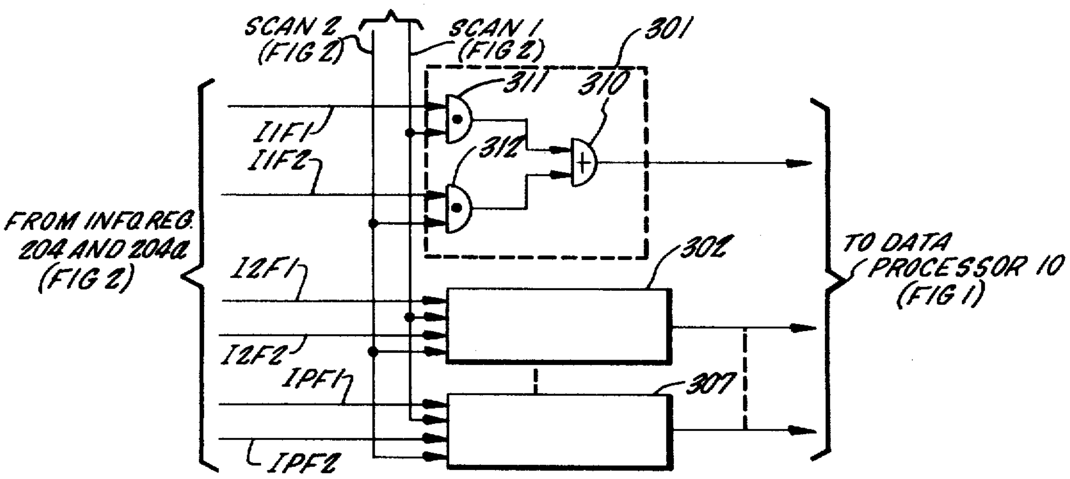

Refer now to the selection and control gates 24 which are shown in detail in FIGS. 7A through 7E. The selection and control gates 24 are shown with a capacity to handle the two buffer unit arrangement shown in FIG. 2. However, it may be expanded as more buffer units are added as explained herein in connection with each of the FIGS. 7A through 7E. FIG. 7A shows the gating circuits for coupling the output circuits of the flip-flop circuits of the information registers 204 and **204*a* to the data processor 10. The information registers 204 and 204*a* flip-flops are coupled to the data processor 10 depending on whether an inquiry is being placed through the teletype terminal unit 20 or the telephone terminal unit 28. Seven gating circuits 301 through 307 are provided. Each of the gating circuits 301 through 307 is arranged for selectively coupling the output circuit of the corresponding flip-flop circuit of both the information register 204 and the information register 204*a* to the data processor 10**.

Referring specifically to the gating circuit 301, the output circuit thereof is connected to an OR gating circuit 310. The gating circuit 310 has its input circuits connected to the output circuits of AND gating circuits 311 and 312. The gating circuit 311 has its input circuits connected to the output circuits I1F1 (FIG. 2) and SCAN.1 (FIG. 2). The gating circuit 312 has its input circuits connected to the output circuits I1F2 (FIG. 2) and SCAN.2 (FIG. 2).

The gating circuits 302 through 307 are identical to the gating circuits 301 except for their inputs. Thus, the input circuits of the gating circuit 302 are from the I2F1 and I2F2 output circuits of the information registers 204 and **204*a***, etc.

The gates of FIG. 7A operate in the following manner. When the scan counter 170 (FIG. 2) is in state 1 a control signal is applied at the SCAN.1 output circuit and the gates 311 of each of the gates 301 through 307 couple the flip-flops I1FF1 through IPFF1 to the data processor 10. However, when the scan counter 170 (FIG. 2) is in state 2, a control signal is applied at the output circuit SCAN.2 and the gates 312 of gates 301 through 307 couple the flip-flops I1FF2 through IPFF2 to the data processor 10.

The circuits of FIG. 7A may be expanded as more buffers are added by adding another AND gate (similar to 311 or 312) for each buffer and connecting the output of the corresponding flip-flop and the correct scan count signal from the scan counter 170 to the added AND gate. Also the output of each additional AND gate must be connected to the OR gate 310.

Figure 7B:
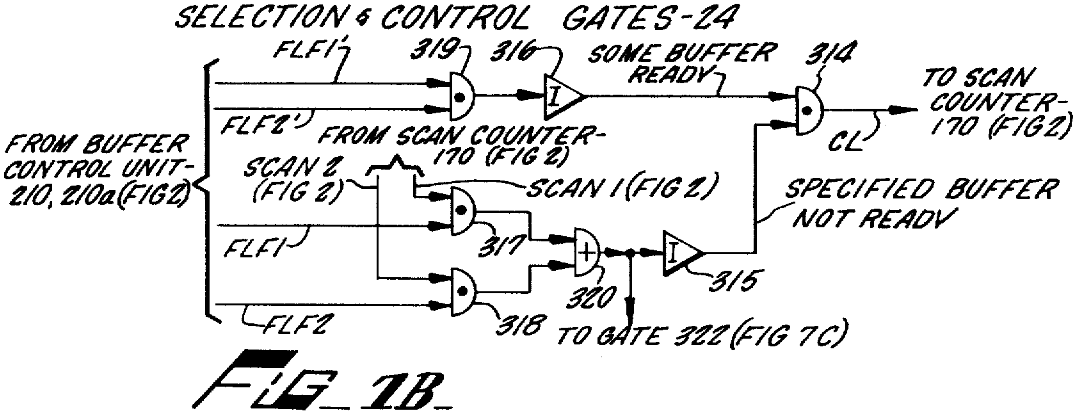

Refer now to FIG. 7B. The CL output circuit, connected to the scan counter 170 for causing it to count, is connected at the output circuit of an AND gating circuit 314. The gating circuit 314 has its input circuits connected to the output circuits of signal inverter circuits 316 and 315. The inverter circuit 315 has its input circuit connected to the output circuit of an OR gating circuit 320. The gating circuit 320 has its input circuits connected to AND gating circuits 317 and 318. The gating circuit 317 has its input circuits connected to the output circuits SCAN. 1 and FLF1. The gating circuit 318 has its input circuits connected to the output circuits SCAN.2 (FIG. 2) and FLF2. The inverter circuit 316 has its input circuit connected to an AND gating circuit 319. The AND gating circuit 319 has its input circuits connected to the output FLF1' and FLF2'.

The control gates of FIG. 7B for the scan counter 170 may be expanded for additional buffer units by connecting the primed output circuit of the FLFF flip-flop of each additional buffer unit to the AND gate 319. Also an additional AND gate (similar to 317 and 318) must be added for each additional buffer. The inputs of each additional AND gate must be connected to the unprimed output of the FLFF flip-flop of the corresponding additional buffer unit and the corresponding scan signal from the scan counter 170. The output circuits of the additional AND gates are connected to the OR gate 320.

Figure 7C:
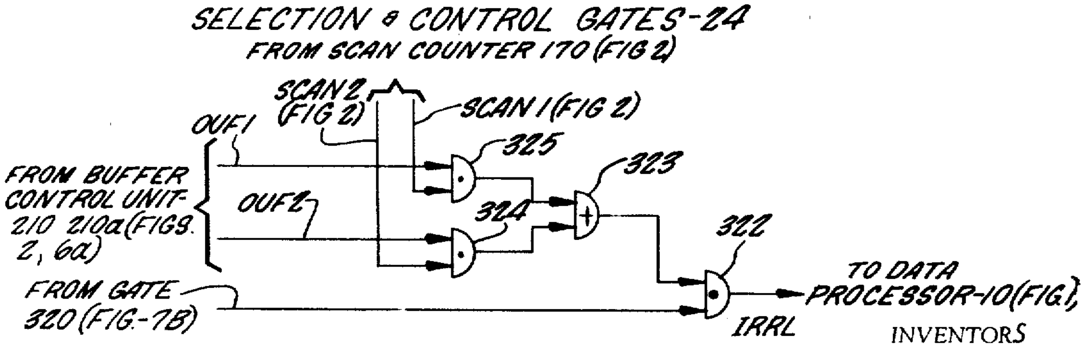

Refer now to FIG. 7C. FIG. 7C shows the selection and control gating circuits of 24 for providing the control signal at the IRRL output circuit of the control unit 16. A control signal at the IRRL output circuit indicates to the data processor that one of the buffer units is storing an inquiry message for the data processor 10. The IRRL output circuit is connected at the output circuit of an AND gating circuit 322. The gating circuit 322 has its input circuit connected to an OR gating circuit 323 and gate 320 (FIG. 7B). The OR gating circuit 327 has its input circuit connected to AND gating circuits 323 and 324. The gating circuit 324 has its input circuits connected to the output circuits SCAN.2 and OUF2 (FIG. 2). The gating circuit 325 has its input circuits connected to the output circuits SCAN.1 and OUF1 (FIG. 2).

The circuit of FIG. 7C may be expanded by adding another gate similar to 324 and 325 for each additional buffer unit and connecting the unprimed output circuit of the OUFF flip-flop of each additional buffer unit and the corresponding output of the scan counter 170 to the corresponding additional gate. The additional gate must be connected to gating circuit 323.

FIG. 7E shows the gating circuits of the selection and control gate 24 for providing the control signal at the IRTL output circuit of the control unit 16. A control signal is applied at the IRTL output circuit concurrently with each character of an inquiry message sent to the data processor 10. The IRTL output circuit is connected at the output circuit of an OR gating circuit 334. The gating circuit 334 has its input circuits connected to the output circuits of AND gating circuits 335 and 336. The gating circuit 335 has its input circuits connected to the output circuits SCAN.1 (FIG. 2), ACF1 and HOF1. The gating circuit 336 has its input circuits connected to the output circuits SCAN.2 (FIG. 2), ACF2 and HOF2.

FIG. 7D shows the gating circuits of the selection and control gates 24 for providing a control signal at the output circuit IWTL. A control signal is applied at the output circuit IWTL each time the buffer unit, receiving a reply message, is ready for the next character. The output circuit IWTL is connected at the output circuit of an OR gating circuit 330. The OR gating circuit 330 has its input circuits connected to the output circuits of AND gating circuits 331 and 332. The gating circuit 331 has its input circuits connected to the output circuits SCAN.1 (FIG. 2), ACF1 and HOF1'. The gating circuit 332 has its input circuits connected to the output circuits SCAN.2 (FIG. 2), ACF2 and HOF2'.

The circuits of FIGS. 7D and 7E can be expanded for additional buffer units by adding an additional AND gate similar to 331 or 332, and an additional AND gate similar to 335 and 336 for each additional buffer unit and connecting the outputs thereof to the corresponding gating circuits 330 and 334. The input circuits of the additional AND gates are connected to the output circuits of the additional buffer units which correspond to the input circuits of FIGS. 7D and 7E. Also the additional AND gates must be connected to the scan count signal corresponding to the connected additional buffer unit.

*Operation of control unit 16*

The operation of the line equipment 12 and the terminal equipment 14 (see FIG. 1) has already been described. The following description is given assuming that the terminal equipment 14 presents an inquiry message to the control unit a character at a time and accepts the reply messages a character at a time as described hereinabove.

The operation of the control unit 16 is given assuming that an inquiry message is composed in the teletype net 18 and sent via the teletype terminal unit 20. Although the following description of operation is primarily directed to a teletype inquiry, the operation for a telephone inquiry is identical except as hereinafter noted in the following description of operation. The following description of operation is given arranged according to the modes of operation noted in Table I.

*Mode 1—Buffer input from terminal unit*

FIG. 9 is a timing diagram illustrating the sequence of operation of the indicated flip-flop circuits and timing circuits of the teletype buffer unit 22 during Mode 1 and should be referred to in the following description of operation.

Assume initially that a control signal is applied at the GECL1 output circuit of the teletype terminal unit 20. Referring to FIGS. 6A, 6B, and 6C, the control signal at the GECL1 output circuit causes the gates 223, 231, 246, 258, 265 to reset the FLFF1, OUFF1, ACFF1, HOFF1, and ODFF1 flip-flops into a 0 state. Also, with reference to FIG. 6H, it will be noted that control signal at the GECL1 output circuit causes the gate 280 to apply a control signal at the CL.AL1 output circuit, causing the address counter 208 to be reset to its initial zero state.

Referring now to FIG. 7, all of the timing flip-flops of the buffer control 210 are now in a zero state. Assume now that the teletype terminal unit 20 applies a control signal at the ICRL1 output circuit indicating that the terminal unit 20 is applying a character to the buffer unit 22 which must be read. Referring to FIG. 6B, the gates 240, 236, and 234 now apply a control signal at the set=1 input circuit of the ACFF1 flip-flop. The next clock pulse triggers the ACFF1 flip-flop into a 1 state.

During the time interval prior to the next clock pulse, all of the flip-flops of the buffer control 210 are in a 0 state except for the ACFF1 flip-flop. Referring to FIG. 6I, this condition of the flip-flops causes the gates 282 and 281 to apply a control signal at the TIN1 output circuit which goes to the gate 205. (FIG. 2). Referring to FIG. 6B, the gates 256 and 254 now apply a control signal at the set=1 input circuit of the HOFF1 flip-flop. Referring to FIG. 6F, the gates 273 and 270 apply a control signal at the SMCL1 output circuit. Thus, the next clock pulse signal causes the character of the inquiry message provided by the teletype terminal unit 20 to be stored in the information register 204, the memory timing unit 206 to start a memory timing cycle, and triggers the HOFF1 flip-flop into a 1 state.

The OUFF1 flip-flop is still in a 0 state. Since the memory timing unit 206 only applies a strobe pulse when a control signal is applied at the OUF1 output circuit, the memory timing unit 206 only develops a read and a write pulse. During the write pulse, the character stored in the information register 204 is written in storage location zero of the core memory 202, as addressed by state zero of the address counter 208.

The FLFF1 and OUFF1 flip-flops are still in a 0 state and the ACFF1 and HOFF1 flip-flops are now in a 1 state. Also, the address counter 208 is in state 0. With reference to FIG. 6H, it will be noted that this state of conditions will not cause a control signal at the CL.AL1 output circuit of the OR gate 280. Therefore, the inverter circuit 279 applies a control signal at the CL.AL1′ output circuit. Referring to FIG. 6G, AND gate 274 now applies a control signal at the CT.AL1 output circuit. Referring to FIG. 6B, the gates 240, 247, and 246 apply a control signal at the reset=0 input circuit of the ACFF1 flip-flop. Thus, the next clock pulse counts the address counter 208 into state one and resets the ACFF1 flip-flop into a 0 state.

The control signal at the ICRL1 output circuit is maintained during a number of clock pulses. Assume now that the teletype terminal unit 20 removes the control signal from the output circuit ICRL1. Referring to FIG. 6B, the absence of a control signal at the ICRL1 output circuit causes the inverter circuit 263 and the gates 260 and 258 to apply a control signal at the reset=0 input circuit of the HOFF1 flip-flop. The next clock pulse causes the HOFF1 flip-flop to be reset into a zero state.

Thus, the ACFF1 flip-flop is a general memory timing flip-flop which is triggered into a 1 state at the beginning of each memory cycle. The HOFF1 flip-flop is a holdover flip-flop which performs a synchronizing function by preventing the memory timing unit 206 from going through more than one memory timing cycle for each character provided by the lower speed teletype terminal unit 20. This prevents the same character from being written in the memory 202 twice.

At this point, the control unit 16 is in a condition wherein it is ready to receive the next character of an inquiry from the teletype terminal unit 20. Each time a control signal is applied at the ICRL1 output circuit of the teletype terminal unit 20, the control unit 16 goes through the same sequence of operation as that described hereinabove causing subsequent characters provided by the terminal unit 20 to be stored in sequential memory locations of core memory 202.

Assume now that a control signal is being applied at the ICRL1 output circuit of the teletype terminal unit 20, the ACFF1 flip-flop is in a 1 state, and the other timing flip-flops of the buffer control 210 are in a 0 state. Also assume that an end-of-inquiry character is now stored in the information register 204.

Referring to FIG. 6B, the gates 256 and 254 again apply a control signal at the set=1 input circuit of the HOFF1 flip-flop. Also gates 273 and 270 apply control signals at the output circuit SMCL1 (FIG. 6F). The next clock pulse triggers the HOFF1 flip-flop into state 1, and causes the memory timing unit 206 to be triggered into a memory timing cycle. Thus, the end-of-inquiry character (stored in the information register 204) is written in the core memory 202.

Prior to the subsequent clock pulse, the end-of-inquiry character is still stored in the information register 204. As described, an end-of-inquiry character is one in which each of the bits of the flip-flop is a binary bit 1. As indicated at the right in FIG. 9 in dashed lines, and with reference to FIG. 6E, the AND gate 267 now applies a control signal at the EIL1 output circuit. This causes the gates 261 and 258 (FIG. 6B) to apply a control signal at the reset=0 input of the HOFF1 flip-flop. Also, control signals are applied by the gates 222 and 220 (FIG. 6A) and control signals are applied by the gates 232 and 228 (FIG. 6A) to the set=1 inputs of the FLFF1 and OUFF1 flip-flops. Thus, the next clock pulse signal triggers the FLFF1 and OUFF1 flip-flops into a 1 state and resets the ACFF1 and HOFF1 flip-flops into a 0 state. Referring to FIG. 6H, gates 284 and 280 now apply a control signal at the CL.AL1 output circuit, and the address counter 208 is reset into a 0 state at the next clock pulse.

It should also be noted that when the flip-flops FLFF1 and OUFF1 were in state 0 and HOFF1 in state 1 and the control signal applied at the EIL1 output circuit, the gates 292 and 290 (FIG. 6K) form a control signal at the output circuit 290$a$ causing the information register 204 (FIG. 2) to be reset and now contains a character zero.

It should be noted at this point that if this were a telephone inquiry and the telephone terminal unit 28 had presented the last character (character 11) of a telephone inquiry to the telephone buffer unit 30 the address counter 208*a* would be in state 10. This would cause a control signal at the output circuit EIL2 (FIG. 6D) and the operation for the telephone buffer 30 would be essentially the same as the teletype buffer 22.

With the FLFF1 and OUFF1 flip-flops both in state 1, the buffer control unit 16 is now ready for reading out the inquiry message and presenting the characters of the message to the data processor 10.

*Mode 2—Buffer output to processor*

Refer now to FIG. 10 which is a timing diagram illustrating the sequence of operation of the telephone buffer unit 22 during Mode 2. The telephone buffer unit 22 is now in Mode 2 and is ready to read out the inquiry message and present it to the data processor 10. At this point, the FLFF1 and OUFF1 flip-flops are in state 1 and the ACFF1 and HOFF1 flip-flops are in state 0. Assume initially that the scan counter 170 is in state 2. The gate 319 (FIG. 7B) does not apply a control signal at the input of the inverter circuit 316. Thus, the inverter 316 circuit applies a control signal at the input of the gating circuit 314, thereby indicating that some buffer of the control unit 16 is ready to read an inquiry message out for the data processor 10. Since the FLFF1 flip-flop is in state 1 and scan counter 170 in state 2, neither the gate 317 nor the gate 318 apply a signal to the OR gate 320. Thus, the OR gate 320 does not apply a control signal to the inverter circuit 315 causing it to apply a control signal to the AND gating circuit 314. The AND gating circuit 314 then applies a control signal at the CL output circuit. This causes the scan counter 170 to count back to state 1. With the scan counter 170 in state 1, the gating circuits 317 and 320 (FIG. 7B) apply a control signal at the input of the inverter circuit 315 and the control signal is removed from the CL output circuit of the AND gating circuit 314. Thus, the scan counter 170, stops counting. Referring to FIG. 7C, the gating circuits 325, 323, and 322 now apply a control signal at the IRRL output circuit. The signal at the IRRL output circuit indicates to the data processor 10 (see FIG. 2) that an inquiry message is ready to be read out of one of the buffer units of the control unit 16 whenever the data processor 10 is ready to receive the inquiry message.

When the data processor 10 is ready to receive the inquiry message, it sends back a control signal at the RIL output circuit (see FIG. 2). Assume now that a control signal is applied at the RIL output circuit of the data processor 10. Referring to FIG. 6B, the gates 241, 237, and 234 now apply a control signal at the set=1 input of the flip-flop circuit ACFF1. The next clock pulse triggers the ACFF1 flip-flop into state 1.

At this point the ACFF1, FLFF1, and OUFF1 flip-flops are in state 1 and the ODFF1 and HOFF1 flip-flops are in state 0. Since an end of inquiry character has not been stored in the information register 204, the inverter circuit 268 (FIG. 6E) applies a signal at the EIL1′ output circuit. The gating circuits 272 and 270 (FIG. 6F) now apply a control signal at the SMCL1 output circuit. Also, the gates 255 and 254 (FIG. 6B) apply a control signal at the set=1 input of the HOFF1 flip-flop. Additionally, the gates 241 and 246 (FIG. 6B) apply a control signal at the reset=0 input of the ACFF1 flip-flop. Thus, the next clock pulse sets the ACFF1 flip-flop into a 0 state, sets the HOFF1 flip-flop into a 1 state, and starts a memory timing cycle by the memory timing unit 206. Since the OUFF1 flip-flop is in a 1 state, the memory timing unit 206 applies a strobe pulse in coincidence with the read pulse, thereby causing the character stored in the memory location zero of the core memory 202, as addressed by the zero state of counter 208, to be read out and stored in the information register 204.

With reference to the timing diagram of FIG. 10 and the gating circuits of FIG. 6B, and using an analysis similar to that described above, it will be noted that the ACFF1 flip-flop is set into a 1 state at the next clock pulse. The ACFF1, HOFF1, FLFF1, and OUFF1 flip-flops are now all in a 1 state and the scan counter 170 in state 1. Therefore, the gates 301 through 307 couple the flip-flops of the information register 204 to the data processor 10. Also, the gates 335 and 334 (FIG. 7E) apply a control signal at the IRTL output circuit which indicates to the data processor 10 that a character is stored in the information register 204 and should be read. The data processor 10 then automatically reads the character coupled thereto by the gates 301 through 307 (FIG. 7A).

Using an analysis similar to that given hereinabove and with reference to the timing diagram of FIG. 10, it will be noted that the next clock pulse causes another memory timing cycle to be started under the control of the gating circuits of FIG. 6F. However, the flip-flop circuits ACFF1, HOFF1, FLFF1 and OUFF1 are all in state 1 and an end of inquiry character is not stored in the information register 204. Thus, at the clock pulse, prior to the actual memory timing cycle, a control signal is applied at the CT.AL1′ output circuit (FIG. 6H) causing the gating circuit 274 (FIG. 6G) to apply a control signal at the CT.AL1 output circuit. The control signal at the CT.AL1 output circuit causes the address counter 208 to count from state zero to state one. Thus, during the read pulse of the memory timing unit 206, the character in storage location one of the core memory 202 is read out and stored in the information register 204. A control signal is again applied at the IRTL output circuit and the gates 301 through 307 couple the information register 204 to the data processor 10 causing the next character of the inquiry message to be read by the data processor 10. This sequence of operation is repeated over and over and the address counter 206 is stepped through its states of operation in order. Thus, the characters of the inquiry message are read out of the core memory 202 in the order in which they were stored. This continues until the end of inquiry character is read out of the core memory 202.

Refer now to the right hand side of the timing diagram of FIG. 10, and assume that the last character of the inquiry message, before the end of inquiry character, has been read by the data processor 10 and a clock pulse occurs causing another timing cycle and causing the address counter 208 to count to its next state of operation. An end of inquiry character is now read out of the core memory 202 and stored in the information register 204. Referring to FIG. 6E, the end of inquiry character, stored in the information register 204, causes a control signal at the EIL1 output circuit. Similar to the operation for the other characters read out of the core memory 202 described hereinabove, the ACFF1 flip-flop is then set back to a 1 state. This again causes a control signal at the IRTL output circuit (FIG. 7E). The data processor 10 then reads the end of inquiry character.

Referring to the discussion for the previous inquiry characters read out of the core memory 202, it will be noted that the flip-flop circuit ACFF1 is normally reset to a 0 state at the clock pulse after an inquiry character is read by the data processor 10. The end of inquiry character is still stored in the information register 204, and a control signal is still applied at the EIL1 output circuit (FIG. 6E). Thus, the gates 259 and 258 (FIG. 6B) apply a control signal at the reset=0 input of the flip-flop HOFF1, and the gates 233 and 231 (FIG. 6A) apply a control signal to the reset=0 input of the OUFF1 flip-flop. Additionally, the gates 283 and 280 (FIG. 6H) apply a control signal at the CL.AL1 output circuit.

Thus, the next clock pulse causes the flip-flops ACFF1, HOFF1 and OUFF1 to be set into a 0 state and the address counter is reset to a zero state. The buffer unit 22 is now in Mode 3 and the data processor 10 starts processing the inquiry message.

It should be noted at this point that if a telephone inquiry message were being read out of the core buffer 202*a*, an end of inquiry message character would not have been stored in the information register 204*a*, but the address counter thereof would be in state 10. Thus, the circuits of FIG. 6D would apply a control signal at the EIL2 output circuit and the gates of FIG. 6A' would have applied a control signal at the reset=0 input of the flip-flop OUFF2. Therefore, the termination of Mode 2 for a telephone inquiry would be essentially identical to that described above for a teletype inquiry.

*Mode 3—Buffer input from data processor*

Refer now to the Mode 3 timing diagram of FIG. 11. Assume initially that the data processor 10 applies a control signal at the WRL output circuit indicating that it is ready to reply to the inquiry message previously sent thereto. The gates 243, 235, and 234 (FIG. 6B) now apply a control signal at the set=1 input of the ACFF1 flip-flop. The next clock pulse causes the ACFF1 flip-flop to be set into a 1 state.

The ACFF1 and FLFF1 flip-flops are now in a 1 state and the OUFF1 and HOFF1 flip-flops are in a 0 state. Also, the scan counter 170 is still in state 1 as it has not received a count signal. The address counter 208 is in state zero. The gates 288 and 286 (FIG. 6I) now apply a control signal at the PIN1 output circuit, causing the gate 203 (FIG. 2) to couple the character of the reply message from the data processor 10 to the information register 204. Also, the gates 271 and 270 (FIG. 6F) apply a control signal at the SMCL1 output circuit. Additionally, the gates 255 and 254 (FIG. 6B) apply a control signal at the set=1 input of the HOFF1 flip-flop. Thus, the next clock pulse causes the HOFF1 flip-flop to be set into a 1 state, the character of information presented by the data processor 10 of the reply message to be stored in the information register 204 and a memory timing cycle to be started by the memory timing unit 206. Since the OUFF1 flip-flop is now in a 0 state, the memory timing unit 206 does not apply a strobe pulse and the character read out of the core memory 202 during the read pulse is not stored in the information register 204. During the subsequent write pulse, the reply character stored in the information register 204 is written in address zero of the core memory 202, as specified by state zero of the address counter 208.

The gates 243 and 258 (FIG. 6B) apply a control signal to the reset=0 input of the HOFF1 flip-flop. Also a control signal is applied at the CL.AL1' output circuit (FIG. 6H) and the gate 274 (FIG. 6G) applies a control signal at the CT.AL1 output circuit. Therefore, the next clock pulse sets the HOFF1 flip-flop into a 0 state, and counts the address counter 208 to state one.

The above cycle of operation starting with the storing of a reply character (from the data processor 10) in the information register 204 and subsequently writing that character into the storage location of the core memory 202 specified by the state of the address counter 208 is repeated, until the complete reply message is written in the core memory 202.

Assume that the complete message is written in the core memory 202. The data processor 10 now supplies an end of reply character which is stored in the information register 204. The end of reply character is detected and a control signal is applied by the gate 226 (FIG. 6A) at the ERL1 output circuit. The ACFF1, HOFF1, and FLFF1 flip-flops are all in a 1 state and the OUFF1 flip-flop is in a 0 state. The gates 224 and 223 (FIG. 6A) now apply a control signal at the reset=0 input of the FLFF1 flip-flop. Also, the gates 230 and 228 (FIG. 6A) apply a control signal at the set=1 input of the OUFF1 flip-flop. Additionally, the gates 243, 248, and 246 apply a control signal at reset=0 input of the ACFF1 flip-flop and the gate 258 (FIG. 6B) applies a control signal at the reset=0 input of the HOFF1 flip-flop. Further, the gates 281 and 280 (FIG. 6H) apply a control signal at the CL.AL1 output circuit. Therefore, the next clock pulse causes the address counter 208 to be reset to the initial zero state, the ACFF1, HOFF1, and FLFF1 flip-flops to be reset into a 0 state, and the OUFF1 flip-flop to be set into a 1 state. It should also be noted that the gates 291 and 290 (FIG. 6K) apply a control signal at the reset line 290*a* causing the end of reply character to be cleared out and a character zero to be stored in the information register 204 (FIG. 2). With the mode control flip-flops FLFF1 and OUFF1 in states 0 and 1, the buffer unit 22 is in Mode 4 ready to commence a buffer output to terminal unit transfer operation.

*Mode 4—Buffer output to terminal unit*

Refer now to the timing diagram shown in FIG. 12 and consider the operation of the buffer unit 22 during Mode 4. The teletype terminal unit 20 and the telephone terminal unit 28 apply control signals at the OCRL1 and OCRL2 output circuits (FIG. 2), respectively, whenever they are ready to receive a reply character. Assume now that the teletype terminal unit 20 applies a control signal at the OCRL1 output circuit. The beginning of Mode 4 is entered with the flip-flop circuits FLFF1, HOFF1, ACFF1, and ODFF1 in a 0 state, whereas the OUFF1 flip-flop is in a 1 state. The gates 242, 238, and 234 (FIG. 6B) apply a control signal at the set=1 input of the ACFF1 flip-flop. Thus, the next clock pulse sets the ACFF1 flip-flop into a 1 state.

The ACFF1 and the OUFF1 flip-flops are in a 1 state and the other timing flip-flops of the buffer control 210 in a 0 state. The gate 264 (FIG. 6C) applies a control signal at the set=1 input of the ODFF1 flip-flop; the gates 242, 249, and 246 (FIG. 6B) apply a control signal at the reset=0 input of the ACFF1 flip-flop, and the gates 273 and 270 (FIG. 6F) apply a control signal at the SM.CL1 output circuit. Thus, the following clock pulse resets the ACFF1 flip-flop into a 0 state, sets the ODFF1 flip-flop into a one state, and starts a memory timing cycle by the memory timing unit 206. The address counter 208 is initially in state 0. Thus, during the memory timing cycle the first character of the reply message is read out of the core memory 24. The OUFF1 flip-flop is in a 1 state, therefore, the memory timing unit 206 applies a strobe pulse causing the character read out of the memory 202 to be stored in the information register 204.

After the teletype terminal unit 20 starts reading a reply character from the buffer unit 22, the control signal is removed from the OCRL1 output circuit. Assume now that teletype terminal unit 20 has removed the control signal from the OCRL1 output circuit. The gates 257 and 254 (FIG. 6B) now apply a control signal at the set=1 input of the HOFF1 flip-flop and the next clock pulse sets the HOFF1 flip-flop into a 1 state.

When the terminal unit 20 has completed reading, translating and sending the first character of the reply message, as discussed hereinabove, the teletype terminal unit 20 again applies a control signal at the OCRL1 output circuit. Assume now that the teletype terminal unit 20 applies the control signal at the OCRL1 output circuit. The timing flip-flops OUFF1, HOFF1, ODFF1 are in a 1 state whereas the FLFF1 and ACFF1 flip-flops are in a 0 state. The gates 239 and 234 (FIG. 6B) now apply a control signal at the set=1 input circuit of the ACFF1 flip-flop. Thus, the following clock pulse causes the ACFF1 flip-flop to be set into a 1 state.

With the ACFF1, OUFF1, HOFF1, and ODFF1 flip-flops in a 1 state and the FLFF1 in a 0 state another character is ready to be read out of the core memory 202. However, before the character can be read out, the address counter 208 must be incremented and the ODFF1 flip-flop must be reset into a 0 state to terminate its control effect on the teletype terminal unit 20. The gates 242, 246 and 249 (FIG. 6B) apply a control signal at the reset=0 input of the ACFF1 flip-flop, the gates 262 and 258 (FIG. 6B) apply a control signal at the reset=0 input of the HOFF1 flip-flop, the gates 266 and 265 (FIG. 6C) apply a control signal at the reset=0 input of the ODFF1 flip-flop, and a control signal is applied at the CL.AL1′ output circuit (FIG. 6H). Thus, the gate 274 (FIG. 6G) applies a control signal at the CT.AL1 output circuit. With these gating conditions, the next clock pulse resets the ACFF1, HOFF1, and ODFF1 flip-flop into a 0 state and counts the address counter 208 into state 1 and the reply character read out operation is terminated. It should be noted in connection with FIG. 5, that the ODF2 output circuit is a control for the motor 158. Thus, the motor 158 is energized and rotates the recording disk 156 whenever the ODFF2 flip-flop is in a 1 state. Also, the motor 158 is deenergized and the rotation of the disk stopped when the flip-flop ODFF2 is reset into its 0 state. The latter operation takes place immediately after a control signal is applied at the OCRL2 output circuit (neglecting the clock period for setting the flip-flops ACFF1 into a 1 state). Thus, the disk 156 is stopped with the actuator 162 actuating the switch 161 (FIG. 5). Hence, the disk 156 is stopped causing a control signal at the OCRL2 output circuit until the disk 156 is again rotated.

During the subsequent clock pulse, the ACFF1 flip-flop is again set into a 1 state. At the next clock pulse the ODFF1 flip-flop is set into a 1 state and another character is read out of the core memory 202 and read by the teletype terminal unit 20.

After the complete inquiry message has been read out of the core memory 202 and sent to the teletype terminal unit 20, the end of inquiry message character is read out and stored in the information register 204. At this point, the gates 226 (FIG. 6A) detect the end of inquiry character. In the manner similar to that described for the other operations of the buffer unit 22, the flip-flop circuits ACFF1, HOFF1, and ODFF1 are then reset into a 0 state and the address counter 208 is reset into its initial zero state. Thus, the read out of the reply characters for the terminal unit is terminated. This causes the Mode 4-buffer output to terminal unit operation to terminate and the buffer unit 22 steps into Mode 1 ready for another inquiry message.

The operation, when Mode 4 is terminated and Mode 1 entered, should be noted at this point. Referring to FIG. 6A, the gates 229 and 231 are the gates which cause a control signal to be applied at the reset=1 input of the OUFF1 flip-flop in response to a control signal at the output circuit ERL1 of the gate 226 (FIG. 6A). A control signal at the ERL1 output circuit indicated an end of reply character and caused Mode 4 to terminate. Referring to FIGS. 6A and 6A′, it has been pointed out that the gates 213 and 214 replace the gates 231, 233, and 229 in a telephone buffer unit 30. The gate 229 (FIG. 6A) was the gate which caused the Mode 4 operation to terminate in a teletype buffer 22. The corresponding gate is missing in FIG. 6A′. Thus in a telephone buffer 30, Mode 4 is not terminated by an end of inquiry message character read out of the core memory 202*a*. Thus, in contrast to the teletype buffer unit 22, the OUFF2 flip-flop of the telephone buffer unit 30 remains in state 1 and since the address counter 208*a* of the telephone buffer unit 30 is reset into its initial zero state, the reply message is again read out of the core memory 202*a* and presented to the telephone terminal unit 28 for encoding to an audible message. This is repeated over and over until the operator at the requesting telephone set hangs up the receiver and terminates the inquiry. When the operator hangs the receiver, a control signal is applied at the GECL2 output as described hereinabove in connection with FIG. 4. Referring to FIG. 6A′, a signal at the GECL2 output circuit causes the gate 213 to apply a control signal at the reset=0 input of the flip-flop OUFF2. This causes the flip-flop OUFF2 to be reset to 0 state and the telephone inquiry to be terminated.

What is claimed is:

1. In an inquiry system including a digital computer having a memory therefor arranged for receiving digital inquiry messages and forming digital reply messages responsive to the inquiry messages, plurality of inquiry means arranged for independently providing digital inquiry messages comprising a series of signals to the computer and for receiving digital reply messages from the computer, and memory means coupled in between the digital computer and the inquiry means for temporarily storing complete inquiry and reply messages being sent between the digital computer and the inquiry means, said memory means comprising means for designating a sequence of locations one by one in said memory means where said inquiry signals are stored and including means for selectively reading the stored messages out thereof and providing same to the computer and inquiry means.

2. In an inquiry system including a digital computer having a memory therefor, a bulk memory unit, said digital computer being arranged for receiving digital inquiry messages and forming digital reply messages responsive to the inquiry messages including reply messages derived from the bulk memory unit, plurality of inquiry devices arranged for independently providing digital inquiry messages comprising a series of signals to the computer and for receiving digital reply messages from the computer, and a memory system connected in between the digital computer and the inquiry devices for temporarily storing complete inquiry and reply messages provided by the digital computer and inquiry devices, said memory means comprising means for designating locations one by one in said memory means for storing said signals and including means for selectively reading a stored inquiry message out of the memory means and presenting the message to the digital computer and means for selectively reading a stored reply message out of the memory means and for providing the reply message to the same inquiry device from which the corresponding inquiry message was received.

3. In an inquiry system including a digital computer having a memory therefor and arranged for receiving digital inquiry messages and forming digital reply messages responsive to the inquiry messages comprising plurality of inquiry means arranged for independently providing digital inquiry messages comprising a series of signals to the computer and for receiving digital reply messages from the computer, and memory means having a preselected group of memory locations for each inquiry means and coupled in between the computer and the inquiry means and arranged for temporarily storing complete inquiry and reply messages being sent between the digital computer and the inquiry means, said memory means comprising means for designating locations one by one in each of said groups of memory locations for the storage of signals in each group of memory locations from the corresponding inquiry means and including means for selectively reading the stored messages out thereof and providing same to the computer and inquiry means.

4. An inquiry system as defined in claim 3 wherein the inquiry means form inquiry messages in an inquiry code and the computer forms reply messages in a computer code, and including terminal means for each inquiry means coupled in between the corresponding inquiry means and the memory means for translating the inquiry coded message formed by the inquiry means into a computer coded message and for translating the computer coded reply messages read out of the corresponding group of memory locations into an inquiry coded message for the inquiry means.

5. An inquiry system as defined in claim 3 including a distributor means for scanning the group of memory locations and for coupling messages between each individual group of memory locations buffer memory device and the computer.

6. In an inquiry system including a digital computer having a memory therefor, a bulk memory unit separate from the computer memory, said digital computer being arranged for receiving digital inquiry messages and forming digital reply messages responsive to the inquiry messages including reply messages derived from the bulk memory unit, plurality of inquiry devices arranged for independently providing digital inquiry messages comprising a series of signals to the computer and for receiving digital reply messages from the computer, memory means coupled in between the inquiry devices and the computer for temporarily storing complete digital inquiry messages and complete reply messages provided by the inquiry devices and the computer, respectively, said memory means including a separate group of memory locations for each inquiry device, address register means for each inquiry device for counting the signals received from the corresponding inquiry device and for designating the memory locations one by one where said signals are to be stored, a terminal device for each inquiry device arranged for receiving an inquiry message from the corresponding inquiry device and for providing same to the memory means for storage, means for selectively reading the stored inquiry messages out of memory means and for providing such inquiry messages to the computer including means for storing a reply message from the computer responsive to an inquiry message, said memory means including means for reading the reply messages out thereof and for providing such reply messages to the same terminal means from which the corresponding inquiry message was received, said terminal devices additionally being arranged for providing a reply message received thereby to the corresponding inquiry device.

7. In an inquiry system including a digital computer having a memory therefor and for receiving a digital inquiry message and for forming a digital reply message to the inquiry message, the messages received and formed by the computer being characterized as serial-by-character and parallel-by-bit and arranged in a computer code, plurality of inquiry devices arranged for independently providing a complete digital inquiry message to the computer and for receiving a digital reply message from the computer, the messages provided and received by the inquiry devices being characterized as serial-by-character and serial-by-bit and arranged in an inquiry code, a buffer memory system coupled in between the computer and inquiry means for temporarily storing a complete digital reply message and a complete inquiry message provided by the computer and inquiry devices respectively, a terminal device for each inquiry device including means for receiving an inquiry message serial-by-character and serial-by-bit from the corresponding inquiry device and for converting the inquiry messages to signals serial-by-character and parallel-by-bit and for providing same to the buffer memory system for storage, means for reading a stored computer coded inquiry message out of the buffer memory system and for providing such inquiry message to the computer serial-by-character and parallel-by-bit including means for storing a computer coded reply message provided by the computer responsive to an inquiry message serial-by-character parallel-by-bit, means for reading a stored computer coded reply message out of the buffer memory system and for providing such reply message serial-by-character parallel-by-bit to the same terminal means from which the corresponding inquiry message was received, said terminal device including means for converting the reply messages received thereby to a message serial-by-character and serial-by-bit.

8. In an inquiry system including a digital computer having a memory therefor and arranged for receiving digital inquiry messages and forming digital reply messages responsive to the inquiry messages, plurality of inquiry devices arranged for independently providing digital inquiry messages to the computer comprising a series of signals and for receiving digital reply messages from the computer, and memory means coupled in between the inquiry devices and the computer for temporarily storing inquiry and reply messages provided by the inquiry devices and the computer including address register means for designating locations in said memory means one by one where said inquiry signals are to be stored, said memory means including means for selectively reading a stored inquiry message out thereof in response to the storage of the end of such message and for presenting the message to the digital computer and means for selectively reading a stored reply message out thereof and for providing the reply message to the same inquiry device from which the corresponding inquiry message was received.

9. In an inquiry system including a digital computer having a memory therefor and arranged for receiving digital inquiry messages and forming digital reply messages responsive to the inquiry messages, plurality of inquiry means arranged for independently providing variable length digital inquiry messages comprising a series of signals to the computer and for receiving digital reply messages from the computer, and memory means coupled in between the inquiry means and the computer for temporarily storing said variable length inquiry messages and reply messages which are being sent between the digital computer and the inquiry means and including address register means for designating the locations one by one in said memory means where said inquiry signals are sequentially stored, said memory means including means for selectively reading the stored messages out thereof and providing same to the computer and inquiry means.

10. In an inquiry system including a digital computer having a memory therefor and arranged for receiving digital inquiry messages and forming digital reply messages responsive to the inquiry messages, plurality of inquiry means arranged for independently providing digital inquiry messages to the computer and for receiving digital reply messages from the computer, and temporary storage means coupled in between the inquiry means and the computer and comprising a memory having addressable memory locations, counting means for sequentially addressing said addressable memory locations, means for storing the inquiry and reply messages being sent between the digital computer and the inquiry means into the addressed locations of said memory and including means for selectively reading the stored messages out of the addressed locations of said memory and for providing same to the computer and inquiry means.

11. In an inquiry system including a digital computer having a memory therefor and arranged for receiving digital inquiry messages and forming digital reply messages responsive to the inquiry messages, plurality of inquiry means arranged for independently providing variable length digital inquiry messages to the computer and for receiving digital reply messages from the computer, and temporary storage means coupled in between the inquiry means and the computer comprising a memory having addressable memory locations therein, counting means for sequentially addressing said addressable memory locations, means for detecting the end of a variable length inquiry message coming from an inquiry means, means for storing the inquiry and reply messages being sent between the digital computer and the inquiry means into the addressed locations of said memory and including means for selectively reading the stored messages out of the addressed locations of said memory and for providing same to the computer and inquiry means, said reading means being responsive to the detection of the end of a variable length inquiry message for reading out such inquiry message.

12. In an inquiry system including a digital computer having a memory therefor and arranged for receiving digital inquiry messages and forming digital reply messages responsive to the inquiry messages, plurality of inquiry devices arranged for independently providing digital inquiry messages to the computer and for receiving digital reply messages from the computer, and individual temporary storage means coupled in between each inquiry device and the computer, each temporary storage means comprising a memory having addressable memory locations therein, counting means for sequentially addressing said adressable memory locations, means for storing inquiry and reply messages provided by the inquiry device and the computer into the addressed memory locations, means for selectively reading a stored inquiry message out of the addressed memory locations and for presenting the message to the digital computer and means for selectively reading a stored reply message out of the addressed memory locations and for providing such reply message to the same inquiry device from which the corresponding inquiry message was received.

13. In an inquiry system including a digital computer having a memory therefor and arranged for receiving digital inquiry messages and forming digital reply messages responsive to the inquiry messages, plurality of inquiry devices arranged for independently providing variable length digital inquiry messages to the computer and for receiving digital reply messages from the computer, and individual temporary storage means coupled in between each inquiry device and the computer, each temporary storage means comprising a memory having addressable memory locations therein, counting means for sequentially addressing said addressable memory locations, means for detecting the beginning and end of an inquiry message from the corresponding inquiry device, means responsive to the detection of the beginning of an inquiry message for storing a message into the addressed memory locations and responsive to the detection of the end of such message for terminating the storage of such message, said storing means additionally storing a reply message provided by the digital computer into the addressed memory locations and means for selectively reading a stored inquiry message out of the addressed memory locations and for presenting the message to the digital computer and means for selectively reading a stored reply message out of the addressed memory locations and providing the reply message to the same inquiry device from which the corresponding inquiry message was received.

14. In an inquiry system including a digital computer having a memory therefor and arranged for receiving digital inquiry messages and forming digital reply messages responsive to the inquiry messages, plurality of inquiry means arranged for independently providing variable length digital inquiry messages having a unique end of inquiry message signal to the computer and for receiving digital reply messages from the computer, and a memory system coupled between the inquiry means and the computer for storing inquiry and reply messages being sent between the computer and the inquiry means including means responsive to said end of inquiry message signal for selectively reading the stored inquiry message out thereof and for providing same to the computer.

15. In an inquiry system including a digital computer having a memory therefor and arranged for receiving digital inquiry messages and forming digital reply messages responsive to the inquiry messages, plurality of inquiry means arranged for independently providing variable length digital inquiry messages composed of a plurality of characters including a unique end of message character to the computer and for receiving digital reply messages from the computer, and a memory system coupled in between the inquiry means and the computer including means for detecting said end character of an inquiry message, said memory system including means for storing inquiry and reply messages being sent between the digital computer and the inquiry means including means for selectively reading the stored messages out thereof and providing same to the computer and inquiry means, said memory system being responsive to the detection of an end of message character of an inquiry message for selectively reading out such message for the computer.

16. In an inquiry system for a digital computer having a memory therefor, arranged for receiving digital inquiry messages and forming digital reply messages having a unique end of message signal responsive to the inquiry messages, the combination comprising plurality of inquiry means arranged for independently providing digital inquiry messages having a unique end of message signal to the computer and for receiving digital reply messages from the computer, and memory means coupled in between such digital computer and the inquiry means for temporarily storing complete inquiry and reply messages being sent between such digital computer and the inquiry means, said memory system including means for sensing an end of message signal in inquiry and reply messages and for causing the memory means to selectively read the corresponding message out thereof and provide same to such computer and inquiry means.

References Cited

UNITED STATES PATENTS

| | | | |
|---|---|---|---|
| 3,029,414 | 4/1962 | Schrimpf | 340—172.5 |
| 3,061,192 | 10/1962 | Terzian | 235—157 |
| 3,181,124 | 4/1965 | Hammel | 340—172.5 |
| 3,200,380 | 8/1965 | MacDonald | 340—172.5 |
| 3,202,972 | 8/1965 | Stafford | 340—172.5 |
| 3,253,263 | 5/1966 | Lee et al. | 340—172.5 |

OTHER REFERENCES

August 1959, Telefile Design Specification SP-100, The Teleregister Corporation, Stamford, Conn.

ROBERT C. BAILEY, *Primary Examiner.*

PAUL J. HENON, I. S. KAVRUKOV, *Assistant Examiners.*

UNITED STATES PATENT OFFICE

CERTIFICATE OF CORRECTION

Patent No. 3,344,401 September 26, 1967

Duncan N. MacDonald et al.

It is hereby certified that error appears in the above numbered patent requiring correction and that the said Letters Patent should read as corrected below.

In the heading to the printed specification, line 4, for "Richard S. Shays" read -- Richard S. Sharp --; column 7, line 58, after "when" insert -- the --; line 67, for "second" read -- send --; column 10, line 27, after "20a" insert -- is --; column 11, line 8, strike out "pulse", second occurrence; column 14, line 26, for "164" read -- 154 --; column 16, lines 23 and 32 and column 17, line 59, for "FLF′", each occurrence, read -- FLF1′ --; column 18, line 22, for "HOF1" read -- HOF1′ --; column 24, line 27, for "CT.AL1′" read -- CL.AL1′ --; column 28, line 31, for "system" read -- means --.

Signed and sealed this 3rd day of December 1968.

(SEAL)
Attest:

EDWARD M.FLETCHER,JR.
Attesting Officer

EDWARD J. BRENNER
Commissioner of Patents